(12) United States Patent
Branton

(10) Patent No.: US 9,260,936 B1
(45) Date of Patent: Feb. 16, 2016

(54) DOWNHOLE BRIDGE PLUG OR PACKER ASSEMBLIES

(76) Inventor: Christopher A. Branton, Bossier City, LA (US)

(*) Notice: Subject to any disclaimer, the term of this patent is extended or adjusted under 35 U.S.C. 154(b) by 830 days.

(21) Appl. No.: 13/468,158

(22) Filed: May 10, 2012

Related U.S. Application Data

(63) Continuation-in-part of application No. 12/592,892, filed on Dec. 4, 2009, now Pat. No. 8,205,671.

(51) Int. Cl.
*E21B 33/12* (2006.01)
(52) U.S. Cl.
CPC .................... *E21B 33/1216* (2013.01)
(58) Field of Classification Search
CPC ..... E21B 33/10; E21B 33/12; E21B 33/1216; E21B 33/128; E21B 33/129; E21B 33/1208; F16J 15/166
See application file for complete search history.

(56) References Cited

U.S. PATENT DOCUMENTS

| | | | | |
|---|---|---|---|---|
| 2,809,080 A * | 10/1957 | Mittell et al. | ................. | 277/458 |
| 3,298,440 A * | 1/1967 | Current | ......................... | 277/340 |
| 4,491,178 A | 1/1985 | Terrell et al. | | |
| 7,290,603 B2 | 11/2007 | Hiorth et al. | | |
| 7,424,909 B2 | 9/2008 | Roberts et al. | | |
| 7,762,323 B2 * | 7/2010 | Frazier | ......................... | 166/126 |
| 7,980,300 B2 | 7/2011 | Roberts et al. | | |
| 8,016,295 B2 * | 9/2011 | Guest et al. | .................... | 277/584 |
| 8,205,671 B1 * | 6/2012 | Branton | ......................... | 166/118 |
| 2009/0126925 A1 * | 5/2009 | Guest et al. | .................... | 166/118 |
| 2013/0192853 A1 * | 8/2013 | Themig | ......................... | 166/387 |

* cited by examiner

*Primary Examiner* — Elizabeth Gitlin
(74) *Attorney, Agent, or Firm* — R. Keith Harrison

(57) ABSTRACT

A bridge plug or packer assembly includes a mandrel. At least one sealing element is provided on the mandrel. A pair of backup rings is provided on the mandrel on respective sides of the at least one sealing element. Each of the pair of backup rings has a single spiraled ring groove. A pair of pressure-applying elements is provided on the mandrel on respective sides of the pair of backup rings, respectively.

20 Claims, 16 Drawing Sheets

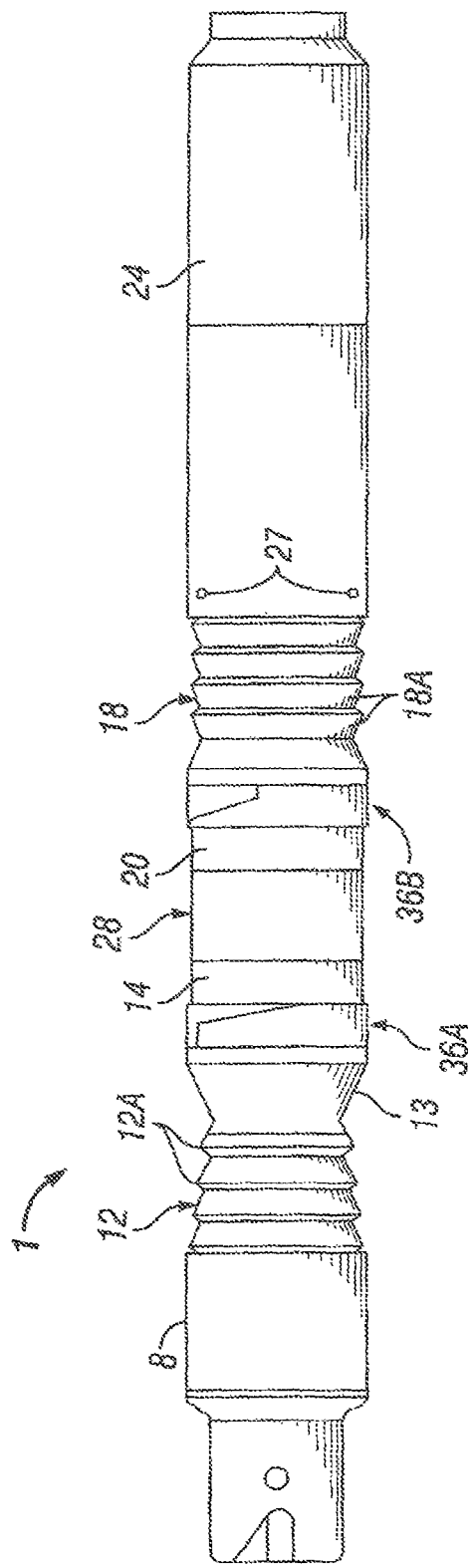
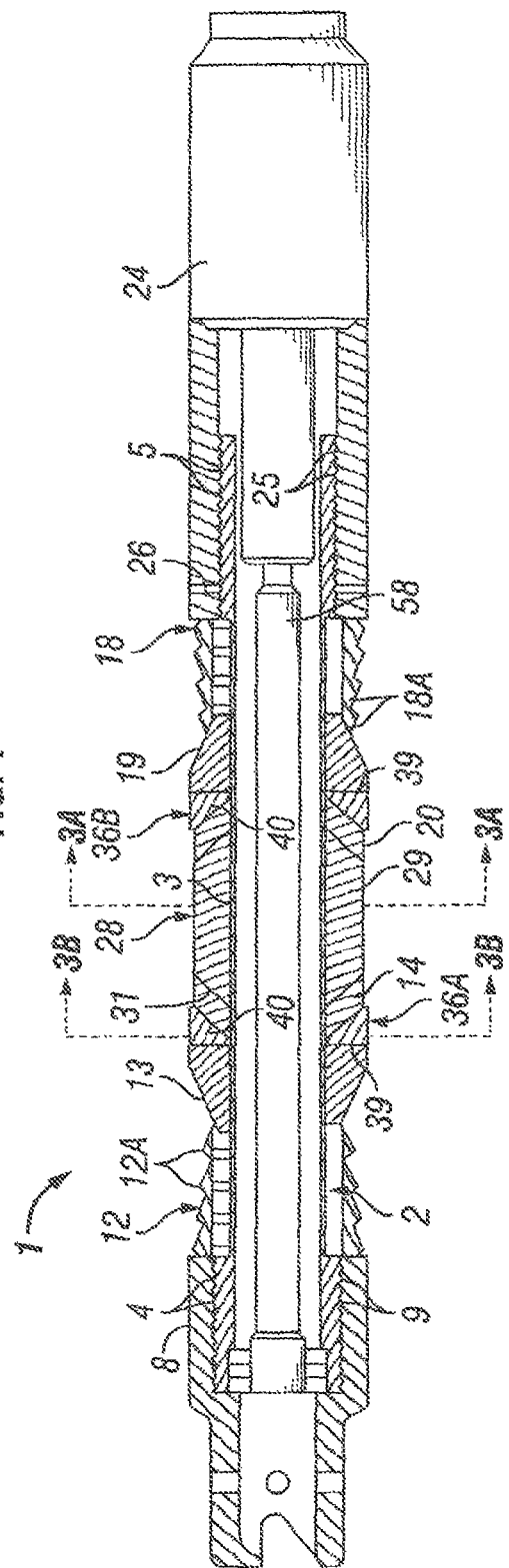

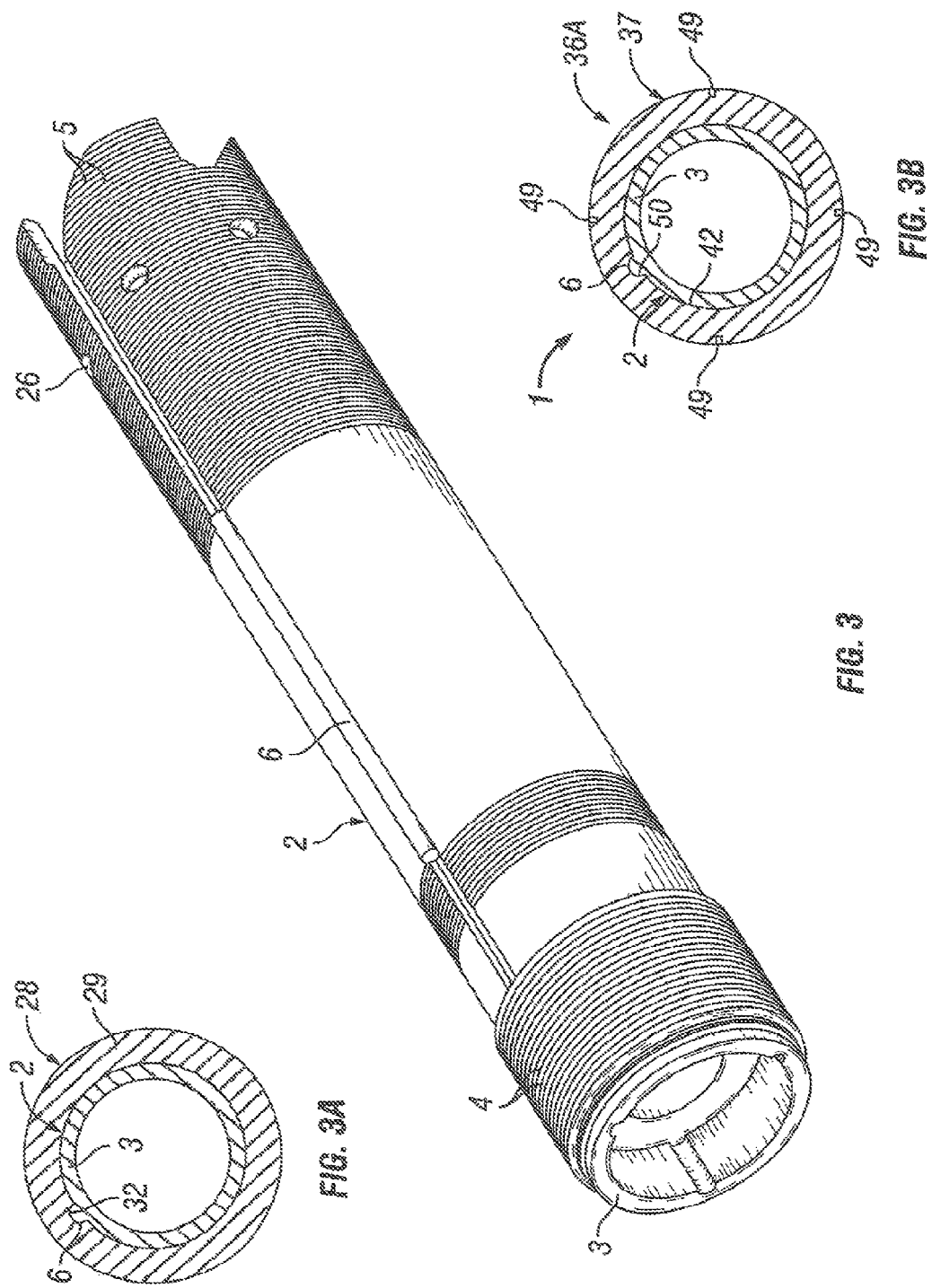

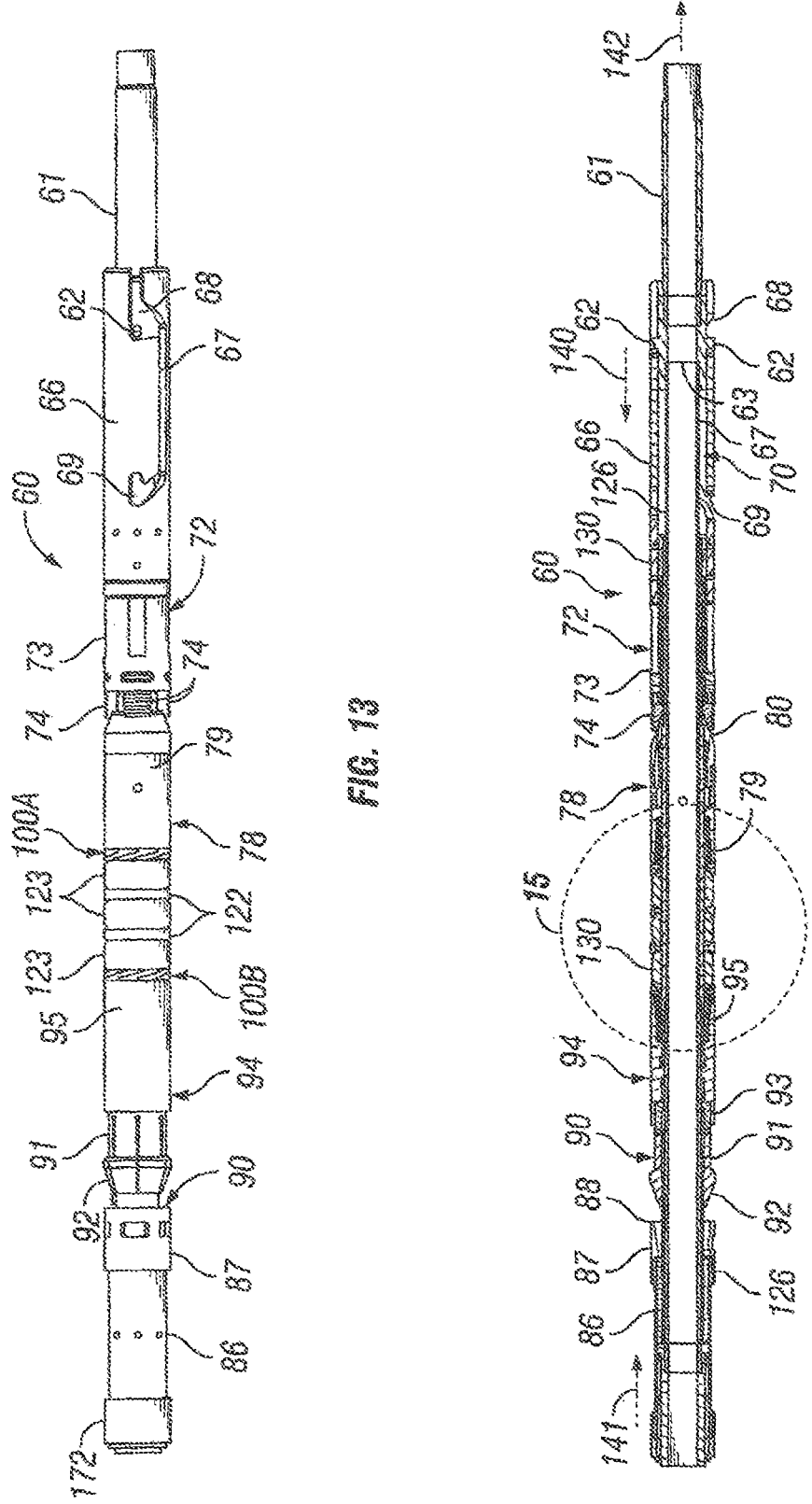

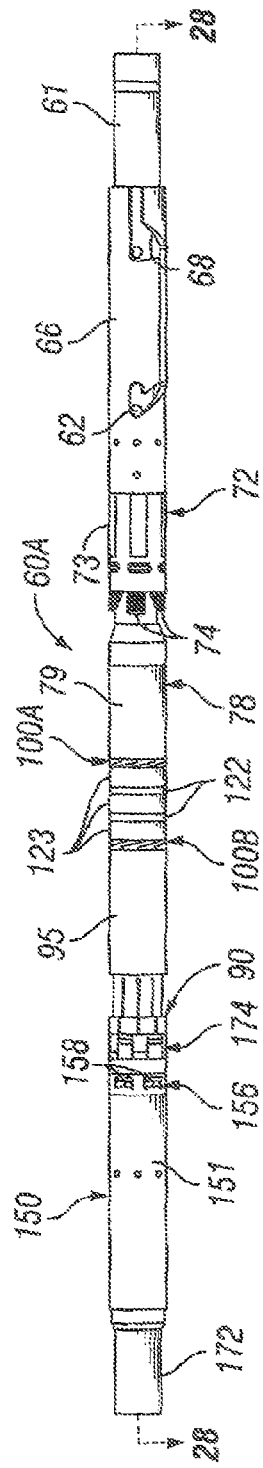
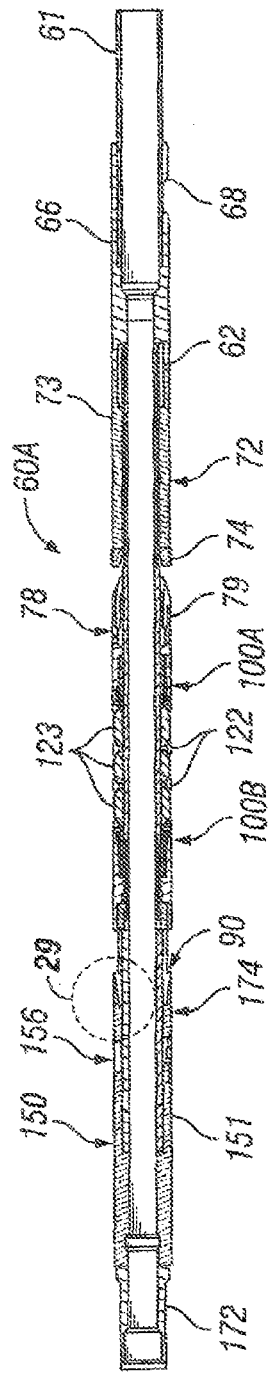
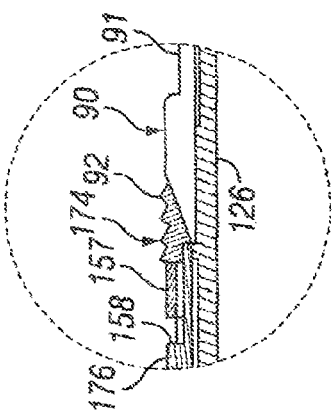
FIG. 27
FIG. 28
FIG. 29

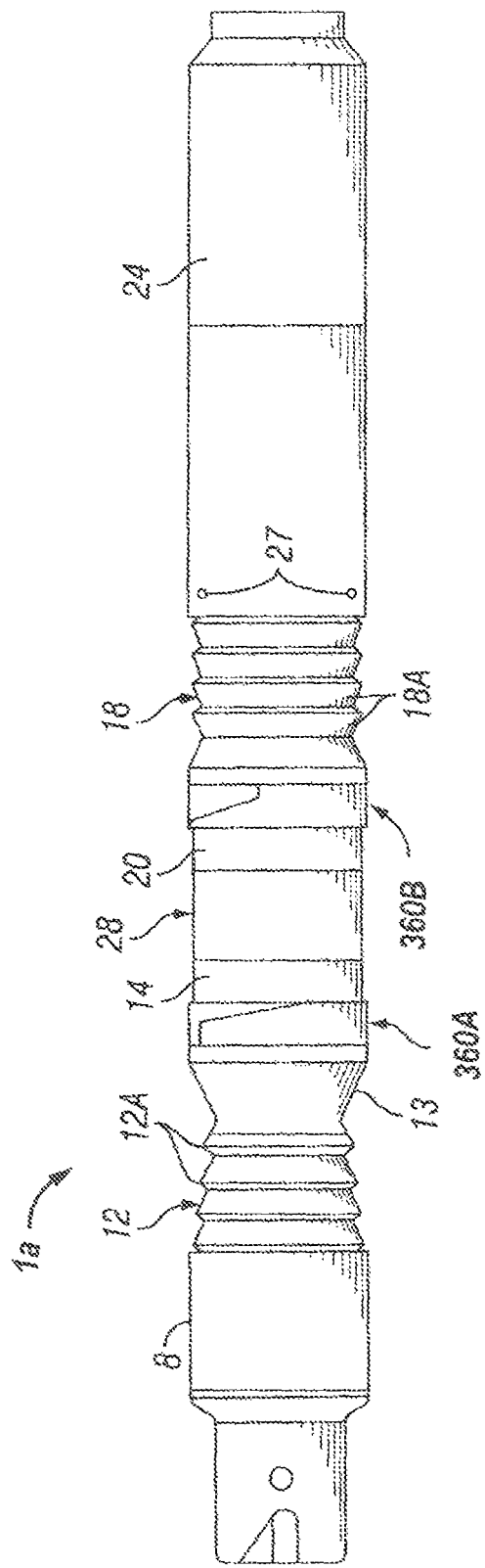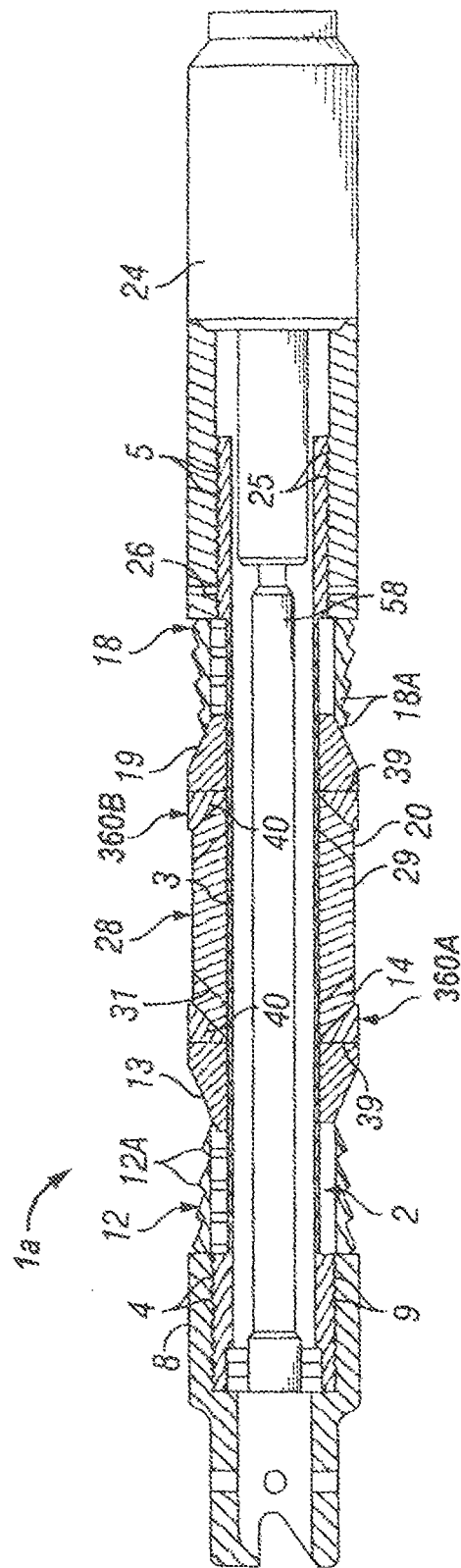

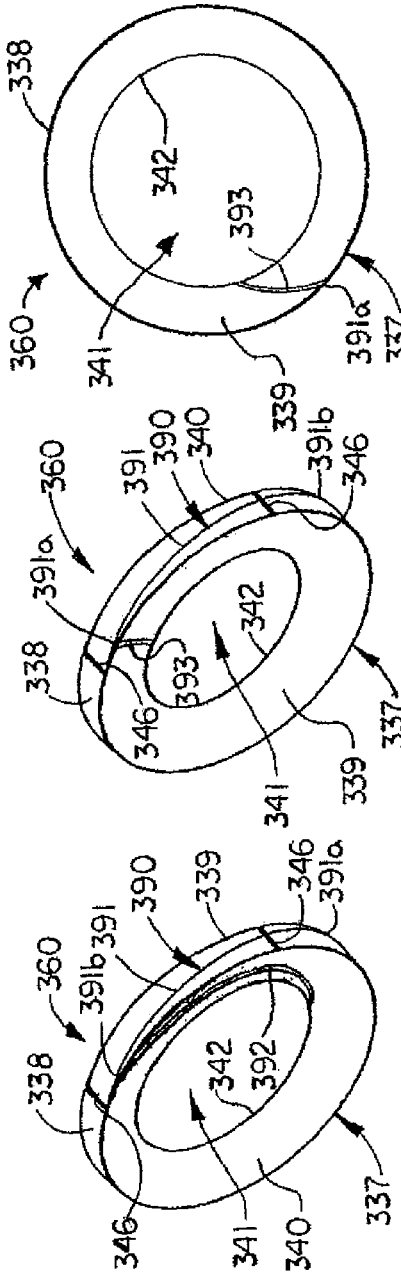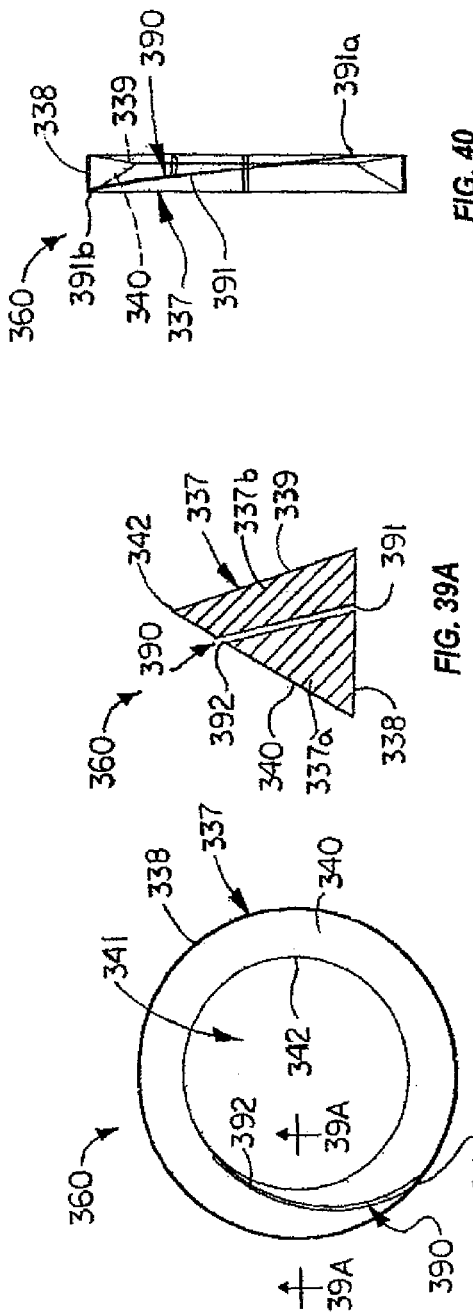

DOWNHOLE BRIDGE PLUG OR PACKER ASSEMBLIES

CROSS-REFERENCE TO RELATED APPLICATIONS

This application is a continuation-in-part of parent U.S. application Ser. No. 12/592,892, filed Dec. 4, 2009 now U.S. Pat. No. 8,205,671 and entitled DOWNHOLE BRIDGE PLUG OR PACKER ASSEMBLIES, which parent application is incorporated by reference herein in its entirety.

FIELD

The disclosure generally relates to downhole bridge plugs for plugging a subterranean well. More particularly, the present disclosure relates to downhole bridge plug or packer assemblies having slotted expandable sealing rings which facilitate a substantially complete circumferential seal with a well casing in the plugging of a subterranean well.

BACKGROUND

In the production of fluids such as hydrocarbons from a subterranean well, it may be desirable to selectively seal or plug the well at various locations. For example, in hydrocarbon (oil and/or gas) production wells, it may be necessary or desirable to seal off a lower hydrocarbon-producing formation during the extraction of hydrocarbons from an upper hydrocarbon-producing formation. In other applications, it may be necessary or desirable to isolate the bottom of the well from the wellhead. Downhole bridge plugs are extensively used in such applications to establish a removable seal in the well.

A conventional downhole bridge plug may include a central mandrel on which is provided at least one expandable sealing element. An annular cone and ridged slip assembly may be provided on the mandrel on each side of the sealing element or elements. The bridge plug may be set in place between adjacent hydrocarbon-producing fractions in the well casing by initially running the bridge plug to the desired location in the casing on a tubing string or using an alternative method and then sliding the slip assemblies onto the respective cones using a hydraulic or other setting tool, causing the slip assemblies to expand against the interior of the casing as they travel on the cones. Simultaneously, the cones move inwardly toward each other and against the sealing rings, causing the rings to expand outwardly against the well casing. Therefore, the slip assemblies and the sealing rings together form a fluid-tight seal to prevent movement of fluids from one fraction to another within the well. When it is desired to re-establish fluid communication between the fractions in the well, the downhole bridge plug may be removed from the well casing. A backup ring may be provided on the mandrel between each cone and the sealing element or elements to reinforce the sealing element or elements after expansion against the casing.

One type of downhole bridge plug, commonly known as a drillable bridge plug, can be removed from the well casing by drilling or milling the bridge plug rather than by retrieving the plug from the casing. In this process, a milling cutter or drill bit is extended through the casing and rotated to grind the plug into fragments until the plug no longer seals the well casing. Drillable bridge plugs may be constructed of a drillable metal, engineering-grade plastic or composite material that can be drilled or ground into fragments by the milling cutter or drill bit.

One drawback of conventional downhole bridge plugs is that the backup rings on the mandrel may inadequately reinforce the sealing element or elements in the casing after the plug expansion process. This may allow the sealing element or elements to slip on the mandrel during application of pressure to the plug. A common drawback of conventional drillable bridge plugs is that during milling or drilling and grinding of the plug, the mandrel has a tendency to rotate or spin with the cutter or drill bit while the sealing rings and other outer sealing components of the plug remain stationary against the interior surface of the well casing. This effect may reduce drilling efficiency and prolong the time which is necessary to remove the plug from the well bore.

Therefore, downhole bridge plug or packer assemblies having slotted expandable backup rings which tightly engage the interior surface of a well casing and reinforce the central sealing element or elements in the plugging of a subterranean well are needed. In some embodiments, the downhole bridge plug assembly may be a drillable bridge plug in which the central mandrel is locked in a stationary configuration with the exterior sealing elements and backup rings of the plug to prevent rotation of the mandrel during removal of the plug from a well casing. In some embodiments, the downhole bridge plug assembly may be a retrievable bridge plug which may be re-usable.

SUMMARY

The disclosure is generally directed to a bridge plug or packer assembly. An illustrative embodiment of the bridge plug assembly includes a mandrel; at least one sealing element provided on the mandrel; a pair of backup rings each having a plurality of spiral ring grooves provided on the mandrel on respective sides of the at least one sealing element; and a pair of pressure-applying elements provided on the mandrel on respective sides of the pair of backup rings, respectively.

In some embodiments, the bridge plug or packer assembly includes a mandrel; a mandrel ridge provided on the mandrel; at least one sealing element provided on the mandrel and having a ridge notch receiving the mandrel ridge; pair of spacer rings provided on the mandrel on respective sides of the at least one sealing element; a pair of backup rings each having a plurality of spiral ring grooves provided on the mandrel on respective sides of the pair of spacer rings, respectively, and a ridge notch receiving the mandrel ridge; and a pair of pressure-applying elements provided on the mandrel on respective sides of the pair of backup rings, respectively.

In some embodiments, the bridge plug or packer assembly includes a mandrel; plug tubing slidably carried by the mandrel; a first pressure-applying element provided on the mandrel and engaged by the plug tubing; a first backup ring having a plurality of spiral ring grooves provided on the mandrel and engaged by the first pressure-applying element; a second backup ring having a plurality of spiral ring grooves provided on the mandrel in spaced-apart relationship with respect to the first backup ring; at least one sealing element provided on the mandrel between the first backup ring and the second backup ring; and a second pressure-applying element provided on the mandrel and engaging the second backup ring.

In some embodiments, the bridge plug or packer assembly includes a mandrel; plug tubing slidably carried by the mandrel; a first pressure-applying element provided on the mandrel and engaged by the plug tubing; a first backup ring provided on the mandrel and engaged by the first pressure-applying element; a second backup ring provided on the mandrel in spaced-apart relationship with respect to the first backup ring; at least one sealing element provided on the mandrel between the first backup ring and the second backup ring; and a second pressure-applying element provided on the mandrel and comprising a cone sleeve provided on the mandrel and engaging the second backup ring; a cone engaging the cone sleeve; a slip assembly provided on the mandrel generally adjacent to the cone; a spring cavity provided in the slip assembly; a spring provided in the spring cavity; and at least one wiper seal disposed between the slip assembly and the mandrel.

BRIEF DESCRIPTION OF THE DRAWINGS

The disclosure will now be made, by way of example, with reference to the accompanying drawings, in which:

FIG. 1 is a side view of an illustrative embodiment of a drillable downhole bridge plug or packer assembly;

FIG. 2 is a longitudinal sectional view of an illustrative embodiment of the drillable downhole bridge plug or packer assembly;

FIG. 3 is a perspective view of a mandrel of an illustrative embodiment of the drillable downhole bridge plug or packer assembly;

FIG. 3A is a cross-sectional view, taken along section lines 3A-3A in FIG. 2, of an illustrative embodiment of the drillable downhole bridge plug or packer assembly;

FIG. 3B is a transverse sectional view, taken along section lines 3B-3B in FIG. 2, of an illustrative embodiment of the drillable downhole bridge plug or packer assembly;

FIG. 13 is a side view of an illustrative embodiment of a retrievable downhole bridge plug or packer assembly;

FIG. 14 is a longitudinal sectional view of an illustrative embodiment of the retrievable downhole bridge plug or packer assembly;

FIG. 27 is a side view of the retrievable downhole plug or packer assembly illustrated in FIG. 21, as the mandrel and the upper slip assembly continue to move in opposite directions during expansion of the assembly;

FIG. 28 is a longitudinal sectional view taken along section lines 28-28 in FIG. 27;

FIG. 29 is an enlarged sectional view, taken along section line 29 in FIG. 28;

FIG. 34 is a side view of an alternative illustrative embodiment of a drillable downhole bridge plug or packer assembly;

FIG. 35 is a longitudinal sectional view of the illustrative embodiment of the drillable downhole bridge plug or packer assembly illustrated in FIG. 34;

FIG. 36 is a front perspective view of a backup ring element of the drillable downhole bridge plug or packer assembly illustrated in FIG. 35;

FIG. 37 is a rear perspective view of the backup ring illustrated in FIG. 36;

FIG. 38 is a rear view of the backup ring illustrated in FIG. 36;

FIG. 39 is a front view of the backup ring illustrated in FIG. 36;

FIG. 39A is a cross-sectional view taken along section lines 39A-39A in FIG. 39;

FIG. 40 is a side view of the backup ring illustrated in FIG. 36; and

DETAILED DESCRIPTION

Figure 4:
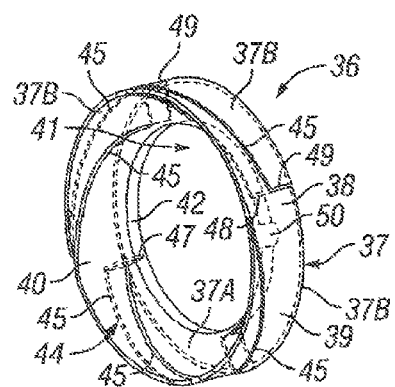
FIG. 4 is a front perspective view of a backup ring element of an illustrative embodiment of the drillable downhole bridge plug or packer assembly with the outer groove segment, the outer radial groove segment and the inner radial groove segment of each of multiple spiral ring grooves illustrated in phantom.
Figure 5:
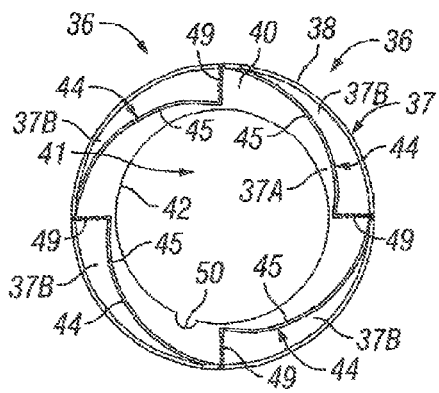
FIG. 5 is a front view of the backup ring.
Figure 6:
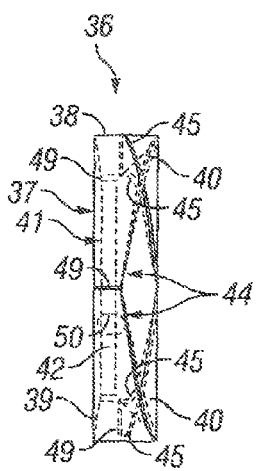
FIG. 6 is a side view of the backup ring.
Figure 7:
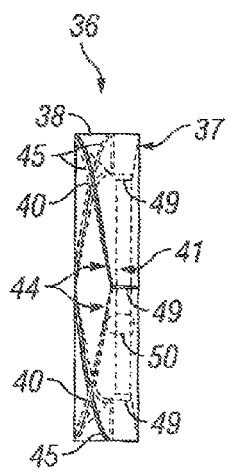
FIG. 7 is a side view which is opposite the side view of the backup ring illustrated in FIG. 6.
Figure 8:
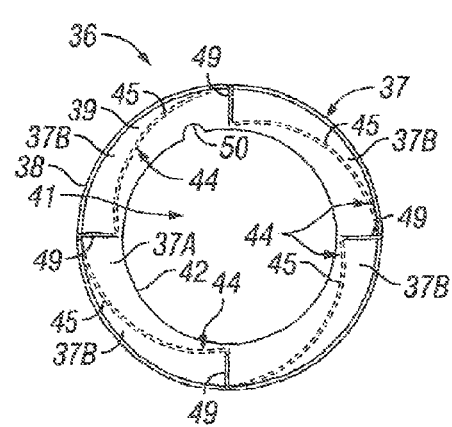
FIG. 8 is a rear view of the backup ring.
Figure 9:
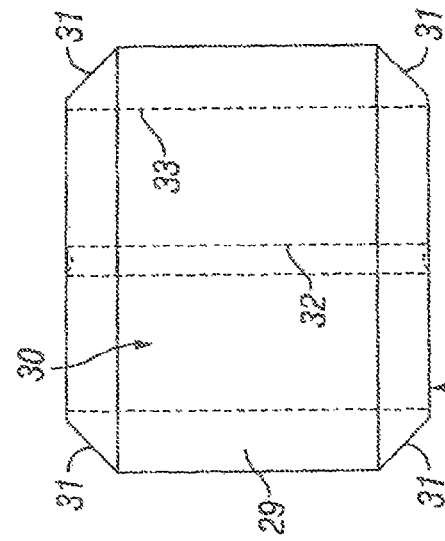
FIG. 9 is a front perspective view of the backup ring.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description.

Referring initially to FIGS. 1-12 of the drawings, an illustrative embodiment of the drillable downhole bridge plug assembly or packer assembly, hereinafter assembly, is generally indicated by reference numeral 1. As illustrated in FIG. 2, the assembly 1 may include a mandrel 2 which may be any suitable type of rigid drillable material including but not limited to metal, composite material and/or engineering-grade plastic. The mandrel 2 may have a generally elongated, cylindrical mandrel wall 3. Multiple lower threads 4 may be provided on the exterior surface of the mandrel wall 3 at a first end of the mandrel 2. Multiple ratchet threads 5 may be provided on the exterior surface of the mandrel wall 3 at a second end of the mandrel 2. A mandrel ridge 6 may extend from the exterior surface of the mandrel wall 3 between the lower threads 4 and the ratchet threads 5 for purposes which will be hereinafter described. As further illustrated in FIG. 2, a mandrel cap 8 may have interior cap threads 9 which threadably engage the lower threads 4 on the mandrel 2. A running-in tool 24 may have interior tool threads 25 which engage the ratchet threads 5 on the mandrel 2. The running-in tool 24 may be provided on a tubing string (not illustrated) to facilitate placement of the assembly 1 in a well casing 52 (FIG. 12) in use of the assembly 1, which will be hereinafter described. In some embodiments, attachment pins 27 (FIG. 1) may be extended through registering pin openings 26 (FIG. 2) provided in the running-in tool 24 and the mandrel wall 3 to facilitate attachment of the running-in tool 24 to the mandrel 2.

A lower pressure-applying element such as an annular lower slip assembly 12 having multiple slip assembly ridges 12a may be provided on the mandrel 2 adjacent to the mandrel cap 8. An upper pressure-applying element such as an annular upper slip assembly 18 having multiple slip assembly ridges 18a may be provided on the mandrel 2 generally adjacent to the running-in tool 24. An annular lower cone 13 may be provided on the mandrel 2 in engagement with the lower slip assembly 12. An annular upper cone 19 may be provided on the mandrel 2 in engagement with the upper slip assembly 18. A lower backup ring 36a may be provided on the mandrel 2 in engagement with the lower cone 13. An upper backup ring 36b may be provided on the mandrel 2 in engagement with the upper cone 19. The structure of the lower backup ring 36a and the upper backup ring 36b will be hereinafter described. An annular sealing element 28, which will be hereinafter described, may be provided on the mandrel 2 between the lower backup ring 36a and the upper backup ring 36b. In some embodiments, a lower sealing element 14 may be interposed between the lower backup ring 36a and the sealing element 28 and an upper sealing element 20 may be interposed between the upper backup ring 36b and the sealing element 28.

As illustrated in FIGS. 4-9, each backup ring 36 includes an annular backup ring body 37 which may be rubber or other elastomeric material and through which extends a ring opening 41. The backup ring body 37 may have a engaging ring surface 38, an outer ring surface 39 which faces and is engaged by the corresponding lower cone 13 (FIG. 2) or upper cone 19, a beveled ring surface 40 which faces and is engaged by the corresponding lower sealing element 14 or upper sealing element 20 and a ring opening surface 42 which faces the ring opening 41.

Multiple spiral ring grooves 44 are provided in the backup ring body 37 of each backup ring 36. In some embodiments four spiral ring grooves 44 may be provided in the backup ring body 37, as illustrated, although in other embodiments a greater or lesser number of spiral ring grooves 44 may be provided in the backup ring body 37. Each spiral ring groove 44 may include a curved main groove segment 45 which extends along a portion of the circumference of the engaging ring surface 38 through the backup ring body 37 to the beveled ring surface 40, generally from the edge of the beveled ring surface 40 toward the edge of the outer ring surface 39, as particularly illustrated in FIGS. 4 and 9. A transverse groove segment 49 of each spiral ring groove 44 may extend radially into the engaging ring surface 38 from the extending end of the main groove segment 45 to the outer ring surface 39 of the backup ring body 37. The spiral ring grooves 44 divide the backup ring body 37 into an inner ring portion 37a and a corresponding number of expandable outer ring portions 37b. Accordingly, application of outwardly-directed pressure to the inner ring portion 37a facilitates uniform outward circumferential expansion of the expandable outer ring portions 37b, for purposes which will be hereinafter described. A ridge notch 50 may be provided in the ring opening surface 42 of the of the backup ring body 37 to receive the mandrel ridge 6 (FIG. 3) on the mandrel wall 3 of the mandrel 2 when the lower backup ring 36a and the upper backup ring 36b is placed on the mandrel 2, as will be hereinafter described.

Figure 10:
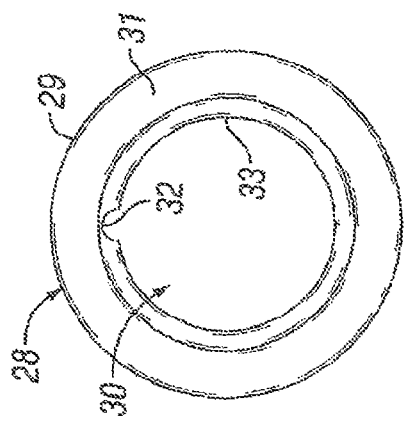
FIG. 10 is a front view of an inside sealing element of an illustrative embodiment of the drillable downhole bridge plug or packer assembly.
Figure 11:
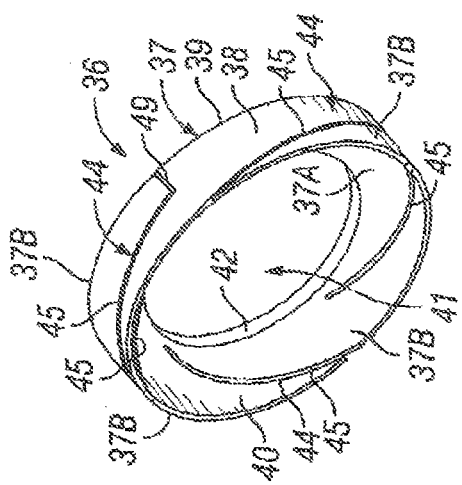
FIG. 11 is a side view of the inside sealing element.

The sealing element 28 of the assembly 1 may be rubber or other elastomeric material. As illustrated in FIGS. 10 and 11, in some embodiments the sealing element 28 may include a generally cylindrical inside sealing element wall 29 having an inside sealing element interior 30. An interior surface 33 of the inside sealing element wall 29 may face the inside sealing element interior 30. An annular wall bevel 31 may be provided in each end of the sealing element 28. A ridge notch 32 may be provided in the interior surface 33 of the inside sealing element wall 29 in the inside sealing element interior 30. The ridge notch 32 receives the mandrel ridge 6 (FIG. 3) which is provided on the exterior surface of the mandrel 2 when the sealing element 28 is placed on the mandrel 2, for purposes which will be hereinafter described.

In typical application of the assembly 1, the sealing element 28 may be placed on the mandrel 2 by inserting the mandrel 2 through the inside sealing element interior 30 (FIGS. 10 and 11). As illustrated in FIG. 3A, the mandrel ridge 6 provided on the mandrel 2 may simultaneously be inserted through the ridge notch 32 provided in the interior surface 33 of the inside sealing element wall 29. In some applications, the lower sealing element 14 and the upper sealing element 20 may be placed on the mandrel 2 adjacent to the respective ends of the sealing element 28. The lower sealing element 14 and the upper sealing element 20 may be suitably configured to engage the wall bevel surface 31 in the corresponding end of the sealing element 28.

The lower backup ring 36a and the upper backup ring 36b are placed on the mandrel 2 adjacent to the lower sealing element 14 and the upper sealing element 20, respectively, by inserting the mandrel 2 through the ring opening 41 (FIGS. 4-9) of each of the lower backup ring 36a and the upper backup ring 36b. As illustrated in FIG. 3B, the mandrel ridge 6 provided on the mandrel 2 may simultaneously be inserted through the ridge notch 50 provided in the ring opening surface 42 of the backup ring body 37 of each of the lower backup ring 36a and the upper backup ring 36b. As illustrated in FIG. 2, the beveled lower sealing element 14 may engage the complementary-shaped beveled ring surface 40 of the lower backup ring 36a, whereas the beveled upper sealing element 20 may engage the complementary-shaped beveled ring surface 40 of the upper backup ring 36b. The lower cone 13 and the upper cone 19 may be placed on the mandrel 2 in engagement with the outer ring surface 39 of the lower backup ring 36a and the upper backup ring 36b, respectively. The lower slip assembly 12 and the upper slip assembly 18 may be placed on the mandrel 2 in engagement with the lower cone 13 and the upper cone 19, respectively. The mandrel cap 8 may be threaded on the lower threads 4 of the mandrel 2 adjacent to the lower slip assembly 12. The running-in tool 24 may be threaded on the ratchet threads 5 of the mandrel 2 adjacent to the upper slip assembly 18. The running-in tool 24 may be additionally attached to the mandrel 2 by extending the pins 27 (FIG. 1) through the respective pin openings 26 (FIG. 2) provided in the running-in tool 24 and registering pin openings (not illustrated) provided in the mandrel 2.

In typical application, the apparatus 1 may be placed in a well casing 52 (FIG. 12) which extends into a subterranean fluid-producing well (not illustrated) such as an oil and/or gas well, for example and without limitation, between two adjacent production fractions in the well to seal the fractions from each other and prevent flow of fluid between the fractions. Accordingly, the mandrel 2 may be attached to the running-in tool 24 and the running-in tool 24 may be attached to a tubing string (not illustrated) such as in the conventional manner. The tubing string may then be inserted in the well casing 52 with the running-in tool 24 and the mandrel 2 attached thereto. In some applications, the well casing 52 may be oriented in a vertical position in the well in which case the lower slip assembly 12, the lower cone 13, the lower backup ring 36a and the lower sealing element 14 may be positioned beneath the upper slip assembly 18, the upper cone 19, the upper backup ring 36b and the upper sealing element 20. In other applications, the well casing 52 may be oriented in a horizontal or diagonal position.

A hydraulic setting tool 58 may next be operated to pull the mandrel 2 and the mandrel cap 8 against the lower slip assembly 12 as the ratchet threads 5 on the mandrel 2 travel along the tool threads 25 of the running-in tool 24. This action pushes the lower slip assembly 12 onto the lower cone 13, as indicated by the arrow 54 in FIG. 12. Simultaneously, the running-in tool 24 may push the upper slip assembly 18 onto the upper cone 19, as indicated by the arrow 55 in FIG. 12. Therefore, the lower cone 13 pushes or expands the lower slip assembly 12 outwardly until the slip assembly ridges 12a of the lower slip assembly 12 engage the interior surface of the well casing 52. In like manner, the upper cone 19 pushes or expands the upper slip assembly 18 outwardly until the slip assembly ridges 18a of the upper slip assembly 18 engage the interior surface of the well casing 52. The lower cone 13 and the upper cone 19 travel along the mandrel 2 against the lower backup ring 36a and the upper backup ring 36b, respectively. This action compresses the sealing element 28, the lower sealing element 14, the upper sealing element 20, the lower backup ring 36a and the upper backup ring 36b between the lower cone 13 and the upper cone 19. Consequently, the sealing element 28 circumferentially engages the interior surface of the well casing 52 and forms a fluid-tight seal between the assembly 1 and the well casing 52. The lower backup ring 36a and the upper backup ring 36b expand outwardly and engage the interior surface of the well casing 52, reinforcing and preventing movement of the sealing element 28 as pressure is subsequently placed on the assembly 1 during well operations.

It will be appreciated by those skilled in the art that as the beveled ring surface 40 of each of the lower backup ring 36a and the upper backup ring 36b is pressed against the beveled surface of the lower sealing element 14 and the upper sealing element 20, respectively, the expandable outer ring portion 37b (FIGS. 4-9) expands away from the inner ring portion 37a of each backup ring 36 along the spiral ring grooves 44. Therefore, the engaging ring surface 38 of each backup ring 36 forms a tight and congruent fit against the interior surface of the well casing 52 and tightly engages the interior surface of the well casing 52, reinforcing and preventing inadvertent movement of the sealing element 28 upon application of pressures to the assembly 1 during well operations. Accordingly, the assembly 1 seals the production fractions from each other through the well casing 52 and operations can be carried out in the well without the leakage of fluid among the separated fractions between the apparatus 60 and the well casing 138.

When removal of the assembly 1 from the well casing 52 is desired, a drill bit or milling cutter (not illustrated) may be inserted through the well casing 52 and operated to grind the assembly 1 into fragments according to the knowledge of those skilled in the art. It will be appreciated by those skilled in the art that during drilling or cutting of the assembly 1, the mandrel 2 is locked in place with the sealing element 28 and each of the lower backup ring 36a and the upper backup ring 36b since the mandrel ridge 6 (FIG. 3) on the mandrel 2 extends through the ridge notch 32 (FIG. 3A) of the sealing element 28 and the ridge notch 50 (FIG. 3B) of each of the lower backup ring 36a and the upper backup ring 36b. Therefore, because the mandrel 2 does not spin with the milling cutter or drill bit, speed and efficiency in cutting and removal of the assembly 1 from the well casing 52 is enhanced.

Referring next to FIGS. 13-20 of the drawings, an illustrative embodiment of a retrievable downhole bridge plug and remediation tool assembly or packer assembly, hereinafter assembly, is generally indicated by reference numeral 60. As illustrated in FIG. 14, the assembly 60 may include a generally elongated mandrel 126. A generally elongated mandrel sleeve 130 may be provided on the mandrel 126. A generally elongated lower plug tubing 66 may be provided on the mandrel sleeve 130. As further illustrated in FIG. 14, an annular slide space 70 may be defined between the lower plug tubing 66 and the mandrel 126 at the lower end of the mandrel 126.

Figure 15:
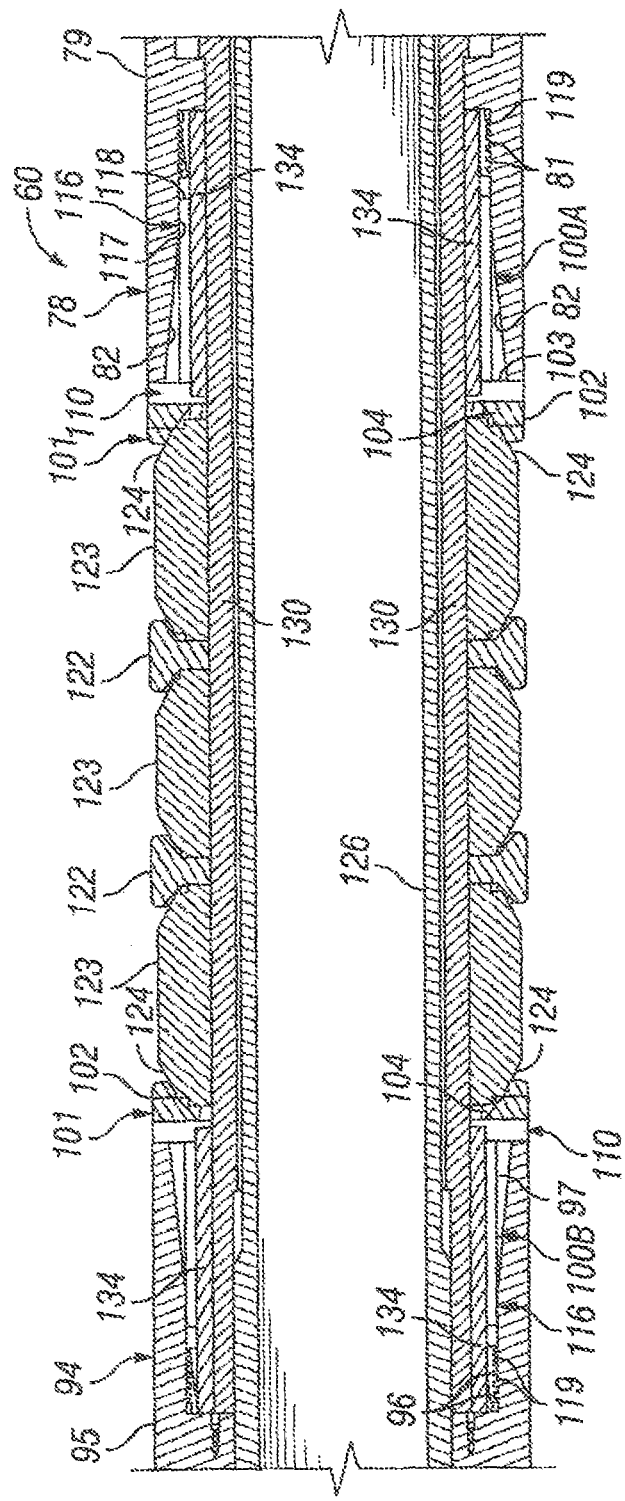
FIG. 15 is an enlarged sectional view, taken along section line 15 in FIG. 14, of the unexpanded backup rings of an illustrative embodiment of the retrievable downhole plug or packer assembly.

A lower pressure-applying element such as a lower slip assembly 72 may be provided on the lower plug tubing 66 and may include an annular lower slip assembly body 73 which extends from the lower plug tubing 66 and multiple, spaced-apart slip assembly flanges 74 which extend from the lower slip assembly body 73. A lower cone 78 may include an annular lower cone body 79 which receives the mandrel sleeve 130 and has a tapered cone surface 80 which engages the slip assembly flanges 74 of the lower slip assembly 72. As illustrated in FIG. 15, an annular lower ring slot 82 may be defined between the lower cone body 79 of the lower cone 78 and the mandrel sleeve 130. Multiple lower cone threads 81 may be provided on the interior surface of the lower cone body 79 in the lower ring slot 82 for purposes which will be hereinafter described. A lower backup ring 100a, the details of which will be hereinafter described, may be provided in the lower ring slot 82.

A cone sleeve 94 having an annular cone sleeve body 95 may be provided on the mandrel 126 and receives an upper end of the mandrel sleeve 130. As illustrated in FIG. 15, an annular upper ring slot 97 may be defined between the cone sleeve body 95 and the mandrel sleeve 130. Multiple upper cone threads 96 may be provided on the interior surface of the cone sleeve body 95 in the upper ring slot 97 for purposes which will be hereinafter described. An upper backup ring 100b, the details of which will be hereinafter described, may be provided in the upper ring slot 97.

An upper cone 90 having an annular upper cone body 91 may be provided on the mandrel 126. A lower end of the upper cone 90 may be attached to the cone sleeve body 95 of the cone sleeve 94 via a threaded or other attachment 93. A beveled cone surface 92 may be provided on an upper end of the upper cone 90.

An upper pressure-applying element such as a slip assembly 86 may be provided on the upper end portion of the mandrel 126. An assembly cap 87 may be provided on a lower end of the upper slip assembly 86. An annular beveled cone-engaging surface 88 may be provided in the assembly cap 87 to receive and engage the complementary beveled upper cone surface 92 of the upper cone 90 in use of the assembly 60 which will be hereinafter described. As illustrated in FIG. 13, a top sub 172 may be attached to the upper slip assembly 86. The top sub 172 may be adapted for attachment to a tubing string (not illustrated), a wire line hydraulic setting tool (not illustrated) or other mechanism which can be used to place the assembly 60 in a well casing according to the knowledge of those skilled in the art.

The lower end of the lower plug tubing 66 may telescopically receive a bottom tubing 61. As illustrated in FIG. 14, the bottom tubing 61 may terminate in a tubing seat 63 which engages the lower end of the mandrel 126 inside the lower plug tubing 66. A pair of spaced-apart lock pins 62 may extend from the bottom tubing 61. As illustrated in FIGS. 13 and 14, a pair of generally elongated pin slots 67, each of which may terminate in a slot inlet 68 on a lower end and a pin seat 69 on an upper end, may be provided in the lower plug tubing 66. The pin slots 67 provided in the lower plug tubing 66 may be adapted to receive the respective lock pins 62 provided on the bottom tubing 61. Accordingly, the bottom tubing 61 can be attached to the lower plug tubing 66 by inserting the bottom tubing 61 in the lower plug tubing 66 while inserting the lock pins 62 in the respective slot inlets 68, sliding the lock pins 62 through the respective pin slots 67 and locating the lock pins 62 in the respective pin seats 69.

As illustrated in FIG. 15, at least one sealing element 123 may be provided on the mandrel sleeve 130 between the lower backup ring 100a and the upper backup ring 100b. Each sealing element 123 may be rubber or other elastomeric material. In some embodiments, multiple seal elements 123 may be provided on the mandrel sleeve 130. An annular separation ring 122 which may be steel or other material may be interposed between adjacent seal elements 123.

Figure 16:
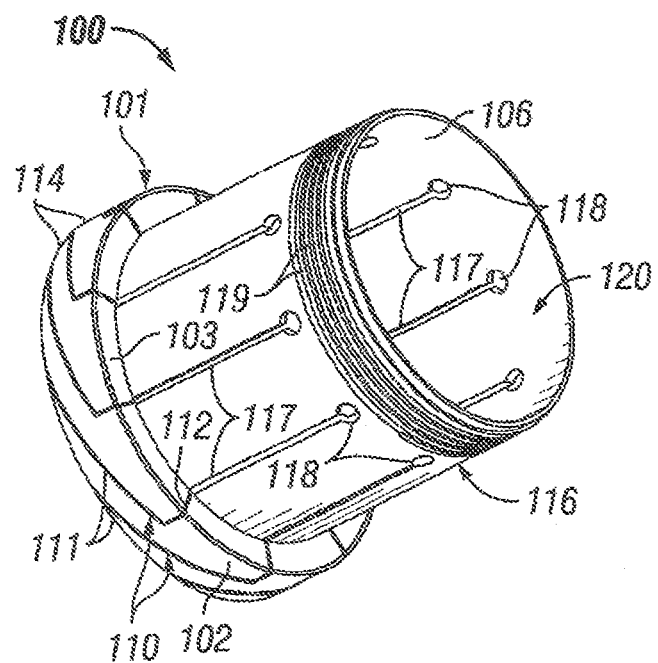
FIG. 16 is a rear perspective view of a backup ring of an illustrative embodiment of the retrievable downhole plug or packer assembly.
Figure 17:
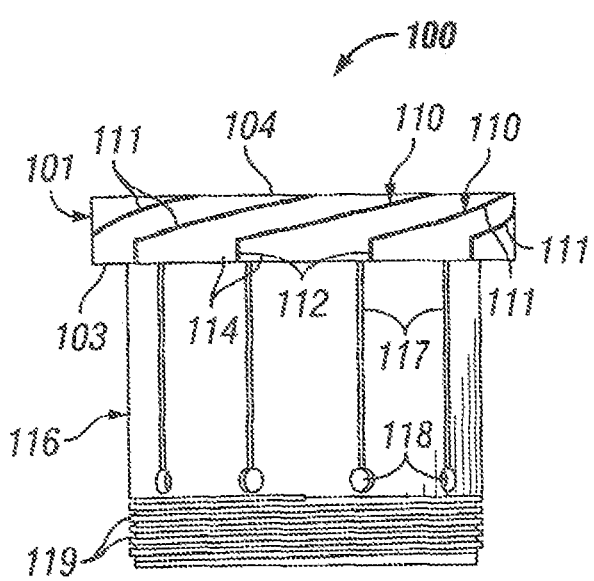
FIG. 17 is a side view of the backup ring illustrated in FIG. 16.
Figure 18:
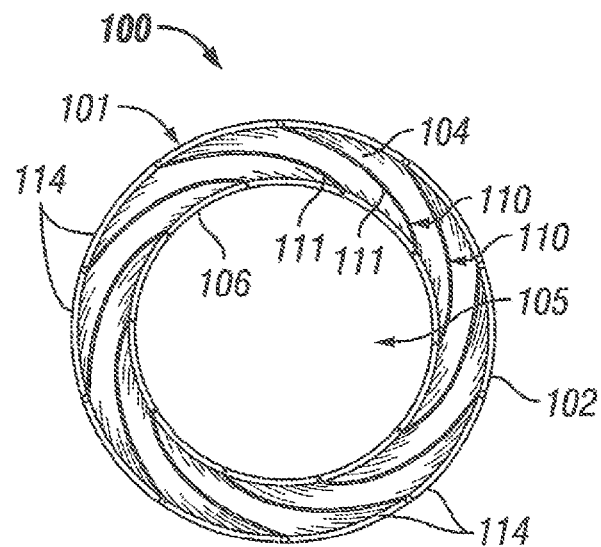
FIG. 18 is a front view of the backup ring illustrated in FIG. 16.
Figure 19:
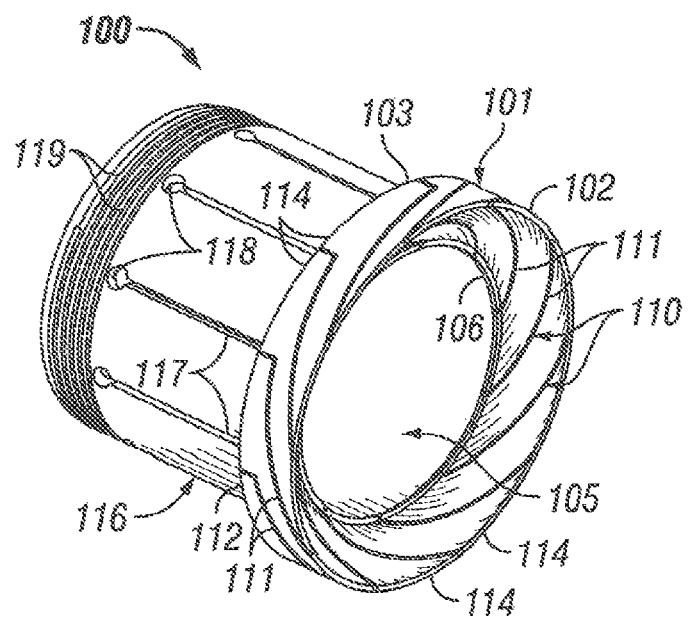
FIG. 19 is a front perspective view of the backup ring illustrated in FIG. 16.

As illustrated in FIGS. 16-19, each of the lower backup ring 100a and the upper backup ring 100b (generally indicated by reference numeral 100 in FIGS. 16-19) may include an annular backup ring body 101 and a generally cylindrical ring sleeve 116 which extends from the backup ring body 101. The backup ring body 101 and the sealing ring sleeve 116 may be rubber or other suitable elastomeric material. The backup ring body 101 may have a engaging ring surface 102, an outer ring surface 103, a beveled ring surface 104 which is opposite the outer ring surface 103, a ring opening 105 which extends through the backup ring body 101 and a ring opening surface 106 which faces the ring opening 105. As illustrated in FIGS. 16 and 17, the ring sleeve 116 may extend from the outer ring surface 103 of the backup ring body 101. As illustrated in FIG. 16, the ring sleeve 116 has a sleeve interior 120 which communicates with the ring opening 105 of the backup ring body 101 of each backup ring 100.

Multiple spiral ring grooves 110 are provided in the ring body 101 of each backup ring 100. Each spiral ring groove 110 may include a main groove segment 111 which extends through the backup ring body 101 from the engaging ring surface 102 to the beveled ring surface 104. The main groove segment 111 of each spiral ring groove 110 extends across a portion of the circumference of the backup ring body 101 generally from the edge of the beveled ring surface 104 toward the edge of the outer ring surface 103. An axial groove segment 112 of each spiral ring groove 110 may extend into the engaging ring surface 102 from the end of each main groove segment 111 to the outer ring surface 103 of the backup ring body 101. Accordingly, the spiral ring grooves 110 may divide or separate the backup ring body 101 into multiple expandable ring portions 114.

Multiple elongated sleeve slots 117 may extend through the ring sleeve 116 in generally parallel, spaced-apart relationship with respect to each other. A sleeve aperture 118 may terminate each sleeve slot 117. As illustrated in FIG. 16, each sleeve slot 117 may communicate with the axial groove segment 112 of a corresponding spiral ring groove 110. Multiple sleeve threads 119 may be provided on the ring sleeve 116 for purposes which will be hereinafter described.

As illustrated in FIG. 15, the lower backup ring 100a and the upper backup ring 100b may be provided on the mandrel sleeve 130 on respective sides of the seal elements 123 and the intervening separation rings 122. The ring sleeve 116 of the lower backup ring 100a may be provided in the lower ring slot 82 between the upper cone body 79 of the lower cone 78 and the mandrel sleeve 130. The sleeve threads 119 on the ring sleeve 116 may engage the lower cone threads 81 on the lower cone 78. In some embodiments, an annular seal ring sleeve 134 may be interposed between the mandrel sleeve 130 and the ring sleeve 116 of the lower backup ring 100a to achieve a secure fit of the lower backup ring 100a on the mandrel sleeve 130: The beveled ring surface 104 on the backup ring body 101 of the lower backup ring 100a may engage a complementary beveled surface 124 on the adjacent sealing element 123.

As further illustrated in FIG. 15, the ring sleeve 116 of the upper backup ring 100b may be provided in the upper ring slot 97 between the cone sleeve body 95 of the cone sleeve 94 and the mandrel sleeve 130. The sleeve threads 119 on the ring sleeve 116 may engage the cone sleeve threads 96 on the cone sleeve 94. In some embodiments, an annular seal ring sleeve 134 may be interposed between the mandrel sleeve 130 and the ring sleeve 116 of the upper backup ring 100b to achieve a secure fit of the upper backup ring 100b on the mandrel sleeve 130. The beveled ring surface 104 on the backup ring body 101 of the upper backup ring 100b may engage a complementary beveled surface 124 on the adjacent sealing element 123.

In typical application, the apparatus 60 may be placed in a well casing 138 (FIG. 20) which extends into a subterranean fluid-producing well (not illustrated) such as an oil and/or gas well, for example and without limitation, between two adjacent production fractions in the well to seal the fractions from each other. In some applications, the apparatus 60 may be used as a well stimulation tool to facilitate pumping of well stimulation fluid (not illustrated) into the well through the well casing 138. Accordingly, a tubing string (not illustrated), a wire line hydraulic setting tool (not illustrated) or other device may be attached to the top sub 172 (FIG. 13) in the conventional manner. The lower plug tubing 66 of the apparatus 60 may be attached to the bottom tubing 61 by inserting the bottom tubing 61 into the lower end of the upper plug tubing 66 as the lock pins 62 on the bottom tubing 61 are inserted in the slot inlets 68, through the pin slots 67 and into the respective pin seats 69 provided in the lower plug tubing 66. As illustrated in FIG. 14, the tubing seat 63 of the bottom tubing 61 may engage the lower end of the mandrel 126. The apparatus 60 may be inserted in the well casing 52 using the tubing string or wire line hydraulic setting tool (not illustrated). In some applications, the well casing 138 may be oriented in a vertical position in the well whereas in other applications, the well casing 138 may be oriented in a horizontal or diagonal position in the well.

Figure 20:
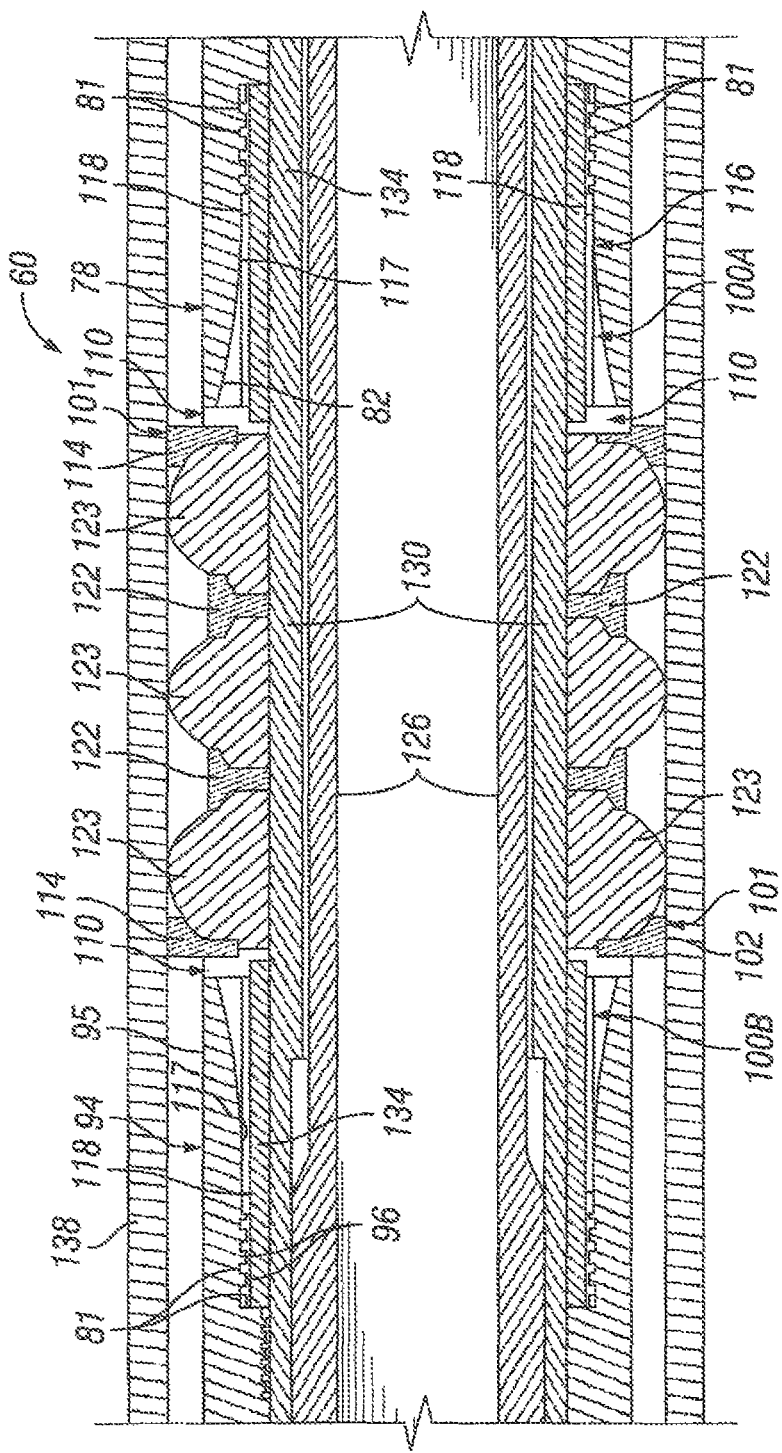
FIG. 20 is an enlarged sectional view of an illustrative embodiment of the retrievable downhole plug or packer assembly, with the backup rings and multiple sealing elements expanded against the interior Surface of a well casing.

After the apparatus 60 has been placed at the desired position in the well casing 138, the apparatus 60 may be set via a hydraulic setting procedure or a tubing setting procedure, according to the knowledge of those skilled in the art. Accordingly, the lower plug tubing 66 and the lower slip assembly 72 may slide along the mandrel sleeve 130 in the direction indicated by the arrow 140 in FIG. 14. The slip assembly flanges 74 of the lower slip assembly 72 may be forced outwardly along the beveled cone surface 80 of the lower cone 78 and may engage the interior surface of the well casing 138 (FIG. 20). The lower slip assembly 72 may push the lower cone 78 along the mandrel sleeve 130. In turn, the lower cone 78 may push the backup ring body 101 of the lower backup ring 100a (FIG. 15) against the beveled surface 124 of the adjacent sealing element 123.

As the lower plug tubing 66, the lower slip assembly 72 and the lower cone 78 slide along the mandrel sleeve 130, the lower slip assembly 86 slides along the mandrel 126 in the direction indicated by the arrow 141 in FIG. 14. The cone-engaging surface 88 in the assembly cap 87 of the upper slip assembly 86 may receive and engage the beveled upper cone surface 92 of the upper cone 90. The upper cone 90 may push the cone sleeve 94 along the mandrel 126 such that the backup ring body 101 (FIG. 15) of the upper backup ring 100b is pushed against the beveled surface 124 of the adjacent sealing element 123.

As illustrated in FIGS. 15 and 20, as the beveled ring surface 104 on the backup ring body 101 of each of the lower backup ring 100a and the upper backup ring 100b is pushed against the complementary beveled surface 124 of the corresponding adjacent sealing element 123, each backup ring body 101 is expanded outwardly until the expandable ring portions 114 of each backup ring body 101 tightly engage the interior surface of the well casing 138, as illustrated in FIG. 20. The seal elements 123 and the separation rings 122 may be compressed between the lower backup ring 100a and the upper backup ring 100b, causing the seal elements 123 to also expand outwardly against the interior surface of the well casing 138, as further illustrated in FIG. 20, and form a fluid-tight seal against the well casing 138. It will be appreciated by those skilled in the art that the spiral ring grooves 110 provided in the backup ring body 101 of each of the lower backup ring 100a and the upper backup ring 100b facilitate substantially uniform expansion of the expandable ring portions 114 outwardly against the interior surface of the well casing 138, forming a tight engagement between the apparatus 60 and the well casing 138. Therefore, the backup rings 100 prevent inadvertent movement of the sealing elements 123 as pressure is applied to the assembly 60 during well operations and the sealing elements 123 of the assembly 60 seal the production fractions in the well from each other and operations can be carried out in the well without the leakage of well fluid between the apparatus 60 and the well casing 138. In some applications, well stimulation processes can be carried out by pumping well stimulation fluids into the well through the mandrel 126 according to the knowledge of those skilled in the art.

When removal of the apparatus 60 from the well casing 138 is desired, setting pressure is released from the lower plug tubing 66 and the upper slip assembly 86. The bottom tubing 61 is pulled, typically by actuation via the tubing string (not illustrated), in the direction indicated by the arrow 142 in FIG. 14. Accordingly, the lock pins 62 on the bottom tubing 61 engage the lower portions of the respective pin seats 69 provided in the lower plug tubing 66. Therefore, the lower plug tubing 66, the lower slip assembly 72 and the lower cone 78 slide along the mandrel sleeve 130 in the direction which is opposite to that indicated by the arrow 140. This action causes the backup ring body 101 of the lower backup ring 100a to slide along the beveled surface 124 of the adjacent sealing element 123 away from the interior surface of the wall casing 138 such that the expandable ring portions 114 (FIGS. 16-19) of the backup ring body 101 contract and disengage the well casing 138 and the backup ring body 101 returns to the pre-expanded position illustrated in FIG. 15. Simultaneously, the seal elements 123, previously compressed between the lower backup ring 100a and the upper backup ring 100b, may become decompressed and disengage the well casing 138, also returning to the pre-expanded position illustrated in FIG. 15. Simultaneously, the upper slip assembly 86 may slide along the mandrel 126 in the direction which is opposite that indicated by the arrow 141. The backup ring body 101 of the upper backup ring 100b slides along the beveled surface 124 of the adjacent sealing element 123 and disengages the interior surface of the well casing 138 and returns to the pre-expanded position illustrated in FIG. 15. The apparatus 60 may then be removed from the well casing 138 by withdrawing the tubing string (not illustrated) from the well casing 138.

Figure 22:
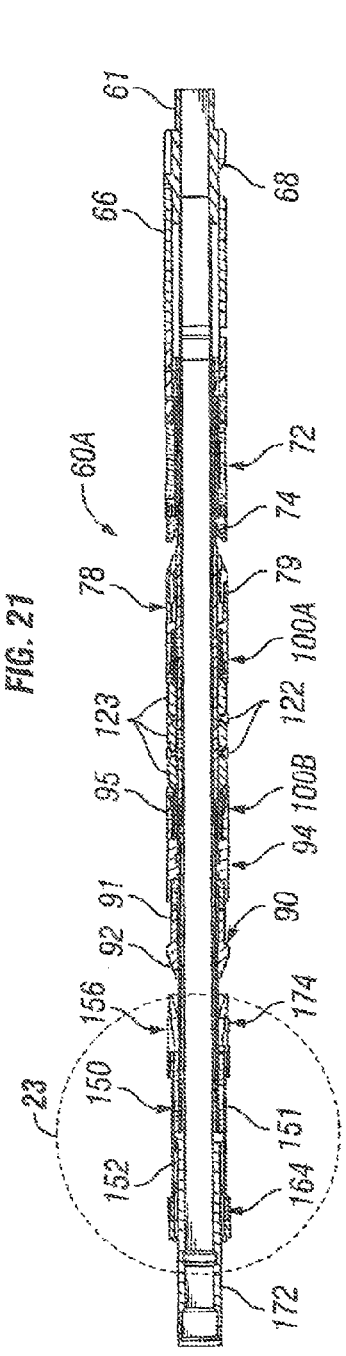
FIG. 22 is a longitudinal sectional view, taken along section lines 21-21, of the retrievable downhole plug or packer assembly illustrated in FIG. 21.
Figure 23:
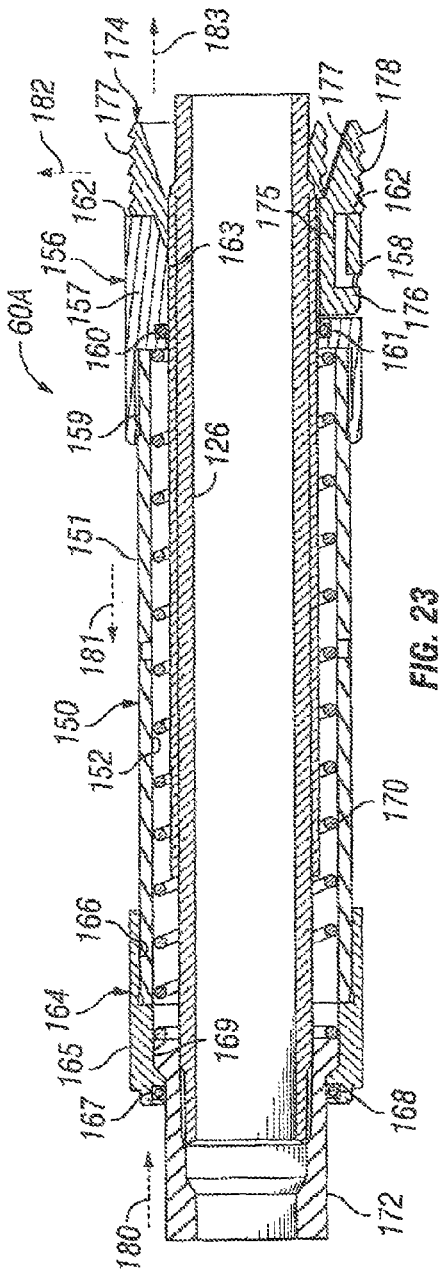
FIG. 23 is an enlarged sectional view, taken along section line 23 in FIG. 22.
Figure 24:
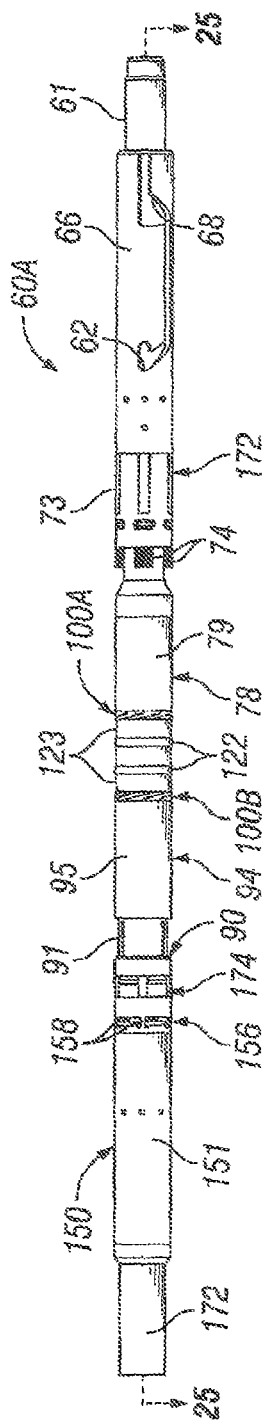
FIG. 24 is a side view of the retrievable downhole plug or packer assembly illustrated in FIG. 21, with the upper slips engaging the upper cone as the mandrel and the upper slip assembly move in opposite directions during expansion of the assembly.
Figure 25:
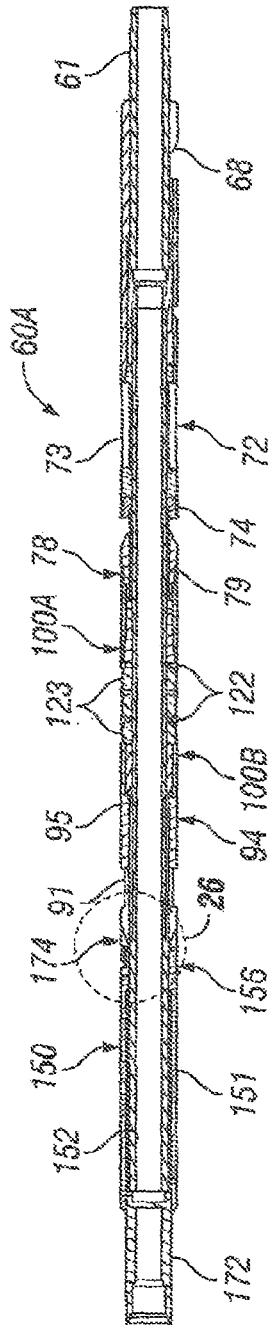
FIG. 25 is a longitudinal sectional view, taken along section lines 25-25, of the retrievable downhole plug or packer assembly illustrated in FIG. 24.
Figure 26:
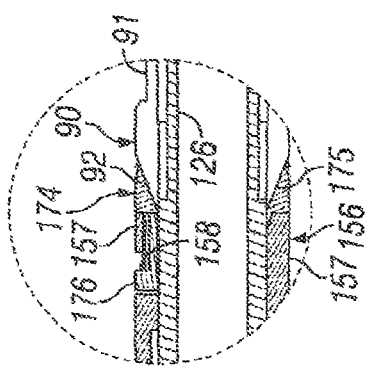
FIG. 26 is an enlarged sectional view, taken along section line 26 in FIG. 25.

Referring next to FIGS. 21-33 of the drawings, an alternative illustrative embodiment of the retrievable downhole plug assembly or packer assembly, hereinafter assembly, is generally indicated by reference numeral 60a. The assembly 60a may be similar in design to the retrievable downhole plug assembly 60 which was heretofore described with respect to FIGS. 13-20. The assembly 60a includes an upper slip assembly 150 which may have a lower slip cage 156 and an upper slip cage 164 provided in spaced-apart relationship with respect to each other on the mandrel 126. A generally elongated, cylindrical spring housing 151 may extend between the lower slip cage 156 and the upper slip cage 164. As illustrated in FIG. 23, an annular spring cavity 152 may be defined between the spring housing 151 and the mandrel 126. A coiled spring 170 may encircle the mandrel 126 in the spring cavity 152 for purposes which will be hereinafter described.

Figure 30:
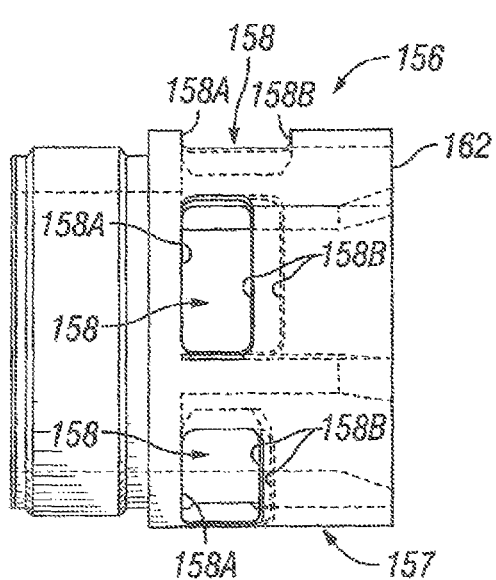
FIG. 30 is a side view of a lower slip cage of the upper slip assembly of the retrievable downhole plug or packer assembly illustrated in FIG. 21.
Figure 31:
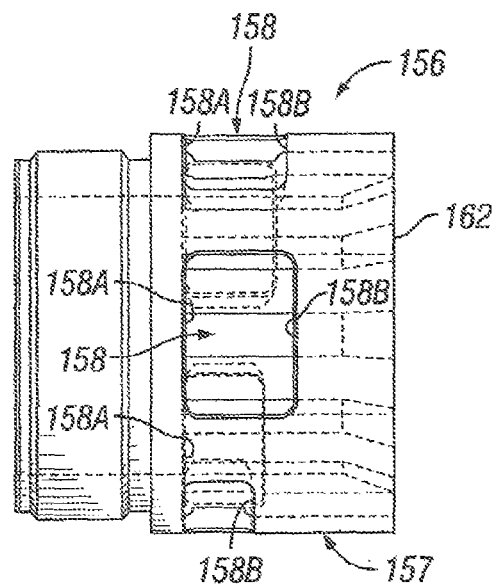
FIG. 31 is a side view of the lower slip cage slightly rotated with respect to the view illustrated in FIG. 30.

As illustrated in FIGS. 23, 30 and 31, the lower slip cage 156 of the upper slip assembly 150 may include an annular lower slip cage body 157 having an annular cage interior 163 (FIG. 23) which receives the mandrel 126. The lower slip cage body 157 has a cone facing edge 162 which generally faces the tapered upper cone surface 92 on the upper cone 90 of the assembly 60a. Multiple slip flange openings 158 are provided in the lower slip cage body 157 in spaced-apart relationship to each other around the circumference thereof. As illustrated in FIG. 23, the lower slip cage body 157 may have a housing receptacle 159 which slidably receives a corresponding lower end of the spring housing 151. Accordingly, the lower slip cage 156 of the upper slip assembly 150 is slidably mounted with respect to the mandrel 126 and the spring housing 151. An annular wiper seal cavity 160 may be provided in the lower slip cage body 157 at the interface between the lower slip cage body 157 and the mandrel 126. A resilient annular wiper seal 161 may be provided in the wiper seal cavity 160 to impart a fluid-tight seal between the lower slip cage body 157 and the mandrel 126.

As further illustrated in FIG. 23, the upper slip cage 164 may include an annular upper slip cage body 165. In some embodiments, an top sub 172 may receive an upper end of the mandrel 126. The upper slip cage body 165 of the upper slip cage 164 may have a housing receptacle 166 which receives a corresponding upper end of the spring housing 151 and an annular cage interior 169 which receives the top sub 172. Accordingly, the upper slip cage 164 of the upper slip assembly 150 is slidably mounted with respect to the top sub 172. An annular wiper seal cavity 167 may be provided in the upper slip cage body 165 at the interface between the upper slip cage body 165 and the top sub 172. A resilient annular wiper seal 168 may be provided in the wiper seal cavity 167 to impart a fluid-tight seal between the upper slip cage body 165 and the top sub 172.

Figure 21:
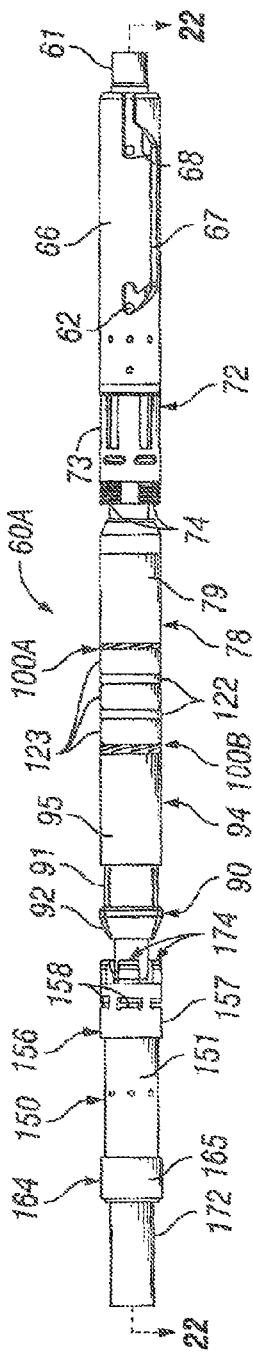
FIG. 21 is a side view of an alternative illustrative embodiment of the retrievable downhole plug or packer assembly, with upper slips disposed in spaced-apart relationship with respect to an upper cone in an insertion configuration of the assembly.

As illustrated in FIG. 23, each of multiple upper slips 174 may include a slip body 175 which extends into the annular cage interior 163 of the lower slip cage body 157. A flange portion 176 extends from a first end of the slip body 175 and is normally inserted in a corresponding one of the spaced-apart, circumferentially-spaced slip flange openings 158 provided in the lower slip cage body 157. A tapered cone-engaging portion 177 extends from a second end of the slip body 175 at the cone facing edge 162 of the lower slip cage body 157. As illustrated in FIGS. 21 and 22, the cone-engaging portion 177 (FIG. 23) of each upper slip 174 is normally disposed in spaced-apart relationship with respect to the upper cone 90 of the assembly 60a. Multiple slip ridges 178 may be provided on the exterior surface of the cone-engaging portion 177, as illustrated in FIG. 23.

Figure 32:
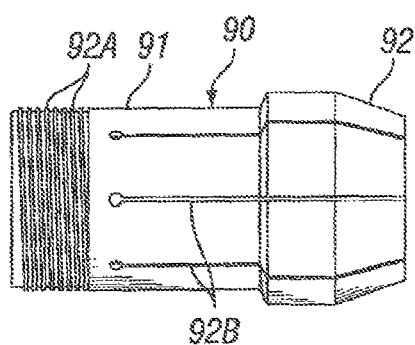
FIG. 32 is a side view of an upper cone of the retrievable downhole bridge plug or packer assembly illustrated in FIG. 21.
Figure 33:
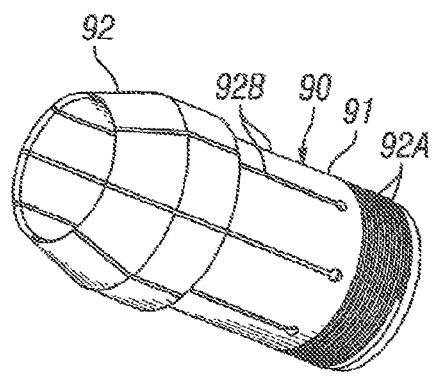
FIG. 33 is a perspective view of the upper cone illustrated in FIG. 32.

An illustrative design for the upper cone 90 of the assembly 60a is illustrated in FIGS. 32 and 33. In some embodiments, exterior cone threads 92a may be provided in the outer surface of the upper cone body 91 at the end thereof which is opposite the tapered upper cone body 92. The exterior cone threads 92a may be adapted to engage companion interior cone sleeve body threads (not illustrated) provided in the cone sleeve body 95 (FIGS. 21 and 22) of the cone sleeve 94 of the assembly 60a. Cone slots 92b may extend longitudinally through the upper cone body 91 and the upper cone body surface 92.

Application of the apparatus 60a may be as was heretofore described with respect to the assembly 60 in FIGS. 13-20. As it is inserted into a well bore (not illustrated), the apparatus 60a may be deployed in the configuration illustrated in FIGS. 21 and 22. Accordingly, the upper slips 174 may be disposed in spaced-apart relationship with respect to the tapered upper cone surface 92 of the upper cone 90, as particularly illustrated in FIG. 21. As the assembly 60a is set in the well casing using a hydraulic setting tool (not illustrated) or other tool-setting method which is known by those skilled in the art, the top sub 172 and the mandrel 126 move in the direction indicated by the rightward arrow 180 while the spring housing 151 and the upper slip cage 164 of the upper slip assembly 150 move in the direction indicated by the leftward arrow 181 in FIG. 23 and the spring housing 151 slides with respect to the initially stationary lower slip cage 156. This action compresses the spring 170 of the upper slip assembly 150 between the top sub 172 and the lower slip cage 156. Therefore, the compressed spring 170 pushes the lower slip cage 156 with respect to the mandrel 126 and the spring housing 151 in the direction indicated by the rightward arrow 183 in FIG. 23. The lower slip cage 156, in turn, pushes the upper slips 174 along the mandrel 126. Eventually, the cone-engaging portion 177 of each upper slip 174 engages the tapered upper cone surface 92 of the upper cone 90, as illustrated in FIGS. 24-29, and then travels along the upper cone surface 92. This action causes the tapered upper cone surface 92 to push or expand the upper slips 174 outwardly, as indicated by the arrow 182 in FIG. 23, until the slip ridges 178 of each upper slip 174 engage the interior surface of the well casing (not illustrated) to secure the assembly 60a in the casing. The sealing elements 123 may expand outwardly to form a seal against the well casing and the lower backup ring 100a and the upper backup ring 100b may reinforce the expanded sealing elements 123, as was heretofore described with respect to FIG. 20. The slip assembly flanges 74 of the lower slip assembly 72 may expand outwardly to engage the casing. It will be appreciated by those skilled in the art that the wiper seal 161 provided in the wiper seal cavity 160 and the wiper seal 168 provided in the wiper seal cavity 167 substantially prevent influx of fluid, sand and other impurities (not illustrated) from the well casing (not illustrated) into the spring cavity 152 of the spring housing 151, eliminating and reducing corrosion and enhancing longevity of the spring 170.

During the release procedure in which the assembly 60a is removed from the well casing, the lower slip cage 156 of the upper slip assembly 150 moves in the direction which is indicated by the arrow 181 in FIG. 23 while the upper slips 174 initially remain stationary on the upper cone 90 and expanded against the interior surface of the well casing. The flange portion 176 of each upper slip 174 slides first from the corresponding slip flange opening 158 and then from the cage interior 163 of the lower slip cage 156 as the upper slips 174 separate from the lower slip cage 156. As the assembly 60a subsequently begins to be pulled from the well casing, the upper slips 174 travel in the reverse direction on the tapered upper cone surface 92 of the upper cone 90 and the slip ridges 178 of the respective lower slips 174 disengage the interior surface of the well casing.

As illustrated in FIGS. 30 and 31, in some embodiments of the assembly 60a, each of the slip flange openings 158 provided in the lower slip cage body 157 of the lower slip cage 156 may have an upper edge 158a and a lower edge 158b which is spaced-apart from the upper edge 158a. The distance between the cone facing edge 162 of the lower slip cage body 157 and the lower edge 158b of each slip flange opening 158 may vary between the slip flange openings 158 such that the slip flange openings 158 have various widths. Therefore, during the releasing procedure of the assembly 60a, the flange portions 176 (FIG. 23) of the respective upper slips 174, rather than simultaneously engaging the upper edges 158b of the respective slip flange openings 158, progressively engage the upper edges 158b before they are pulled from the cage interior 163 of the lower slip cage 156, resulting in progressive detachment of the upper slips 174 from the lower slip cage 156. This progressive detachment of the upper slips 174 may reduce the pressure which is required to detach the lower slip cage 156 from the upper slips 174 during the releasing procedure.

Referring next to FIGS. 34-41 of the drawings, an alternative illustrative embodiment of the drillable downhole bridge plug assembly, hereinafter assembly, is generally indicated by reference numeral 1a. The assembly 1a may be the same as or similar in design and function to the assembly 1 which was heretofore described with respect to FIGS. 1 and 2 where like elements are designated by like reference numerals in FIGS. 34, 35 and 41. In the assembly 1a, a lower backup ring 360a may be provided on the mandrel 2 in engagement with the lower cone 13. An upper backup ring 360b may be provided on the mandrel 2 in engagement with the upper cone 19. The structure of the lower backup ring 360a and the upper backup ring 360b will be hereinafter described.

The lower backup ring 360a and the upper backup ring 360b may have a design which is similar to that of the lower backup ring 36a and the upper backup ring 36b heretofore described with respect to FIGS. 4-9, where like elements are designated by like reference numerals in FIGS. 4-9. Accordingly, each of the lower backup ring 360a and the upper backup ring 360b includes an annular backup ring body [37] 337 which may be rubber or other elastomeric material and through which extends a ring opening 341. The backup ring body 337 may have an engaging ring surface 338, an outer ring surface 339 which faces and is engaged by the corresponding lower cone 13 (FIG. 35) or upper cone 19, a beveled ring surface 340 which faces and is engaged by the corresponding lower sealing element 14 or upper sealing element 20 (FIG. 35) and a ring opening surface 342 which faces the ring opening 341.

As illustrated in FIG. 40, the outer ring surface 339 and the beveled ring surface 340 may each be oriented at a taper angle with respect to the plane of the backup ring body 337. As illustrated in FIG. 35, in the assembled assembly 1a, the outer ring surface 339 of the upper backup ring 360a faces outwardly and is engaged by the lower cone 13, whereas the outer ring surface 339 of the lower backup ring 360b faces outwardly and is engaged by the upper cone 19. The inner beveled ring surface 340 of the upper backup ring 360a faces inwardly and engages the sealing element 28, and the inner beveled ring surface 340 of the lower backup ring 360b faces inwardly and also engages the sealing element 28.

As illustrated in FIGS. 36-40, a single spiraled ring groove 390 is provided in the backup ring body 337 of each backup ring 360. As illustrated in FIG. 39A, the depth of the spiraled ring groove 390 may extend from the engaging ring surface 338 through the backup ring body 337 to the beveled ring surface 340. As illustrated in FIGS. 36 and 37, the spiraled ring groove 390 may include an elongated main groove segment 391 which may be curved or spiraled and extends along a portion of the circumference of the engaging ring surface 338. A generally curved inner surface groove segment 392 (FIGS. 36 and 39) extends from the main groove segment 391 of the spiraled ring groove 390 along a portion of the beveled ring surface 340. An outer surface groove segment 393 (FIGS. 37 and 38) extends from the main groove segment 391 along a portion of the outer ring surface 339. As further illustrated in FIGS. 36 and 37, the main groove segment 391 may have an outer main groove segment end 391a at the outer ring surface 339 and an inner main groove segment end 391b at the beveled ring surface 340.

As illustrated in FIGS. 36 and 39, the inner surface groove segment 392 may extend lengthwise from the engaging ring surface 338 to the ring opening surface 342. As particularly illustrated in FIG. 39, the inner surface groove segment 392 may be generally tangential with respect to both the engaging ring surface 338 and with respect to the ring opening surface 342. As illustrated in FIG. 36, at the engaging ring surface 338, the inner surface groove segment 392 may communicate with the inner main groove segment end 391b of the main groove segment 391.

As illustrated in FIGS. 37 and 38, the outer surface groove segment 393 may extend lengthwise from the engaging ring surface 338 to the ring opening surface 342. At the engaging ring surface 338, the outer surface groove segment 393 may communicate with the outer main groove segment end 391a of the main groove segment 391. As illustrated in FIG. 39A, the spiraled ring groove 390 divides a portion of the backup ring body 337 into an inner ring portion 337a and an expandable outer ring portion 337b. Accordingly, application of outwardly-directed pressure to the backup ring body 337 facilitates uniform outward circumferential expansion of the expandable outer ring portion 337b from the inner ring portion 337a, for purposes which will be hereinafter described.

As illustrated in FIGS. 36 and 37, in some embodiments, at least one channel 346 may extend into the engaging ring surface 338 of the backup ring body 337. The channel 346 may traverse the width of the backup ring body 337.

Figure 12:
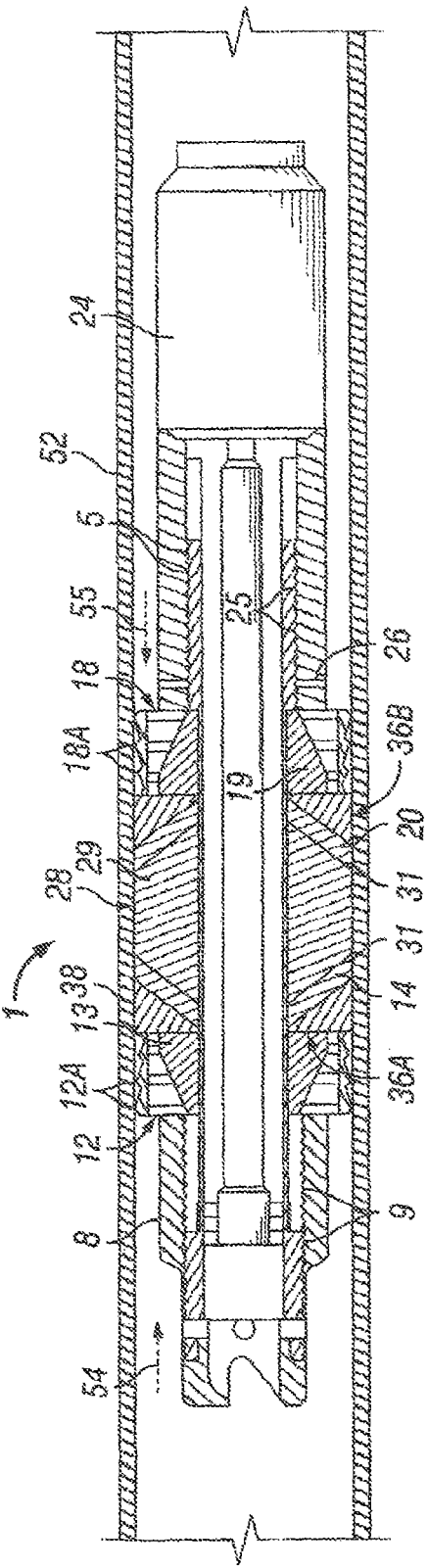
FIG. 12 is a longitudinal sectional view of an illustrative embodiment of the drillable downhole bridge plug or packer assembly, with a pair of slip assemblies, a pair of cones and a pair of backup rings expanded against the interior surface of a well casing.
Figure 41:
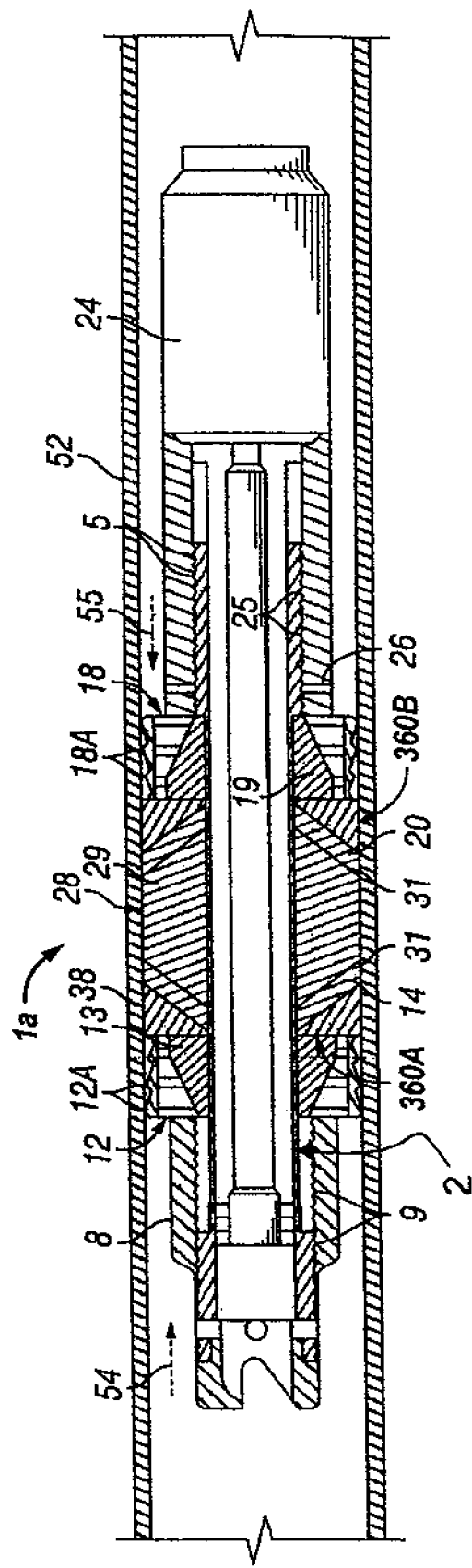
FIG. 41 is a longitudinal sectional view of an illustrative embodiment of the drillable downhole bridge plug or packer assembly illustrated in FIG. 34, with a pair of slip assemblies, a pair of cones and a pair of backup rings expanded against the interior surface of a well casing.

As illustrated in FIG. 41, typical application of the assembly 1a may be as was heretofore described with respect to application of the assembly 1 in FIG. 12. Accordingly, as the lower slip assembly 12 travels onto the lower cone 13, as indicated by the arrow 54, the running-in tool 24 may simultaneously push the upper slip assembly 18 onto the upper cone 19, as indicated by the arrow 55. Therefore, the lower cone 13 pushes or expands the lower slip assembly 12 outwardly until the slip assembly ridges 12a of the lower slip assembly 12 engage the interior surface of the well casing 52. In like manner, the upper cone 19 pushes or expands the upper slip assembly 18 outwardly until the slip assembly ridges 18a of the upper slip assembly 18 engage the interior surface of the well casing 52. The lower cone 13 and the upper cone 19 travel along the mandrel 2 against the lower backup ring 360a and the upper backup ring 360b, respectively. This action compresses the sealing element the lower sealing element 14, the upper sealing element 20, the lower backup ring 360a and the upper backup ring 360b between the lower cone 13 and the upper cone 19. Consequently, the sealing element 28 circumferentially engages the interior surface of the well casing 52 and forms a fluid-tight seal between the assembly 1a and the well casing 52. The lower backup ring 360a and the upper backup ring 360b expand outwardly and engage the interior surface of the well casing 52, reinforcing and preventing movement of the sealing element 28 as pressure is subsequently placed on the assembly 1a during well operations.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A bridge plug or packer assembly, comprising:
   a mandrel;
   at least one sealing element provided on said mandrel;
   a pair of backup rings provided on said mandrel on respective sides of said at least one sealing element, each of said pair of backup rings having an engaging ring surface, a ring opening, a ring opening surface facing said ring opening, an outer ring surface and an inner beveled ring surface extending from said engaging ring surface to said ring opening surface and a single spiraled ring groove including an elongated main groove segment extending along a portion of a circumference of said engaging ring surface;

a generally curved inner surface groove segment extending from said main groove segment along a portion of said beveled ring surface;

an outer surface groove segment extending from said main groove segment along a portion of said outer ring surface; and a pair of pressure-applying elements provided on said mandrel on respective sides of said pair of backup rings, respectively.

2. The bridge plug or packer assembly of claim 1 wherein said pair of pressure-applying elements comprises a pair of slip assemblies.

3. The bridge plug or packer assembly of claim 1 wherein said main groove segment has an outer main groove segment end at said outer ring surface and an inner main groove segment end at said beveled ring surface.

4. The bridge plug or packer assembly of claim 1 wherein each of said pair of backup rings comprises an annular backup ring body and wherein said single spiral ring groove extends through said backup ring body.

5. The bridge plug or packer assembly of claim 1 wherein said backup ring body comprises an inner ring portion and an outer ring portion expandable with respect to said inner ring portion, and wherein said single spiral ring groove generally separates said outer ring portion from said inner ring portion.

6. The bridge plug or packer assembly of claim 1 further comprising at least one channel extending into said engaging ring surface.

7. The bridge plug or packer assembly of claim 1 wherein each of said pair of backup rings comprises an annular backup ring body and wherein said single spiral ring groove extends through said backup ring body and said outer ring surface and said beveled ring surface are each oriented at a taper angle with respect to a plane of said backup ring body.

8. A bridge plug or packer assembly, comprising:
a mandrel;
at least one sealing element provided on said mandrel;
a pair of backup rings provided on said mandrel on respective sides of said sealing element, each of said pair of backup rings having an engaging ring surface, a ring opening, a ring opening surface facing said ring opening, an outer ring surface and an inner beveled ring surface extending from said engaging ring surface to said ring opening surface and a single spiraled ring groove, said single spiraled ring groove having a depth extending from said engaging ring surface to said beveled ring surface, said single spiraled ring groove including an elongated main groove segment extending along a portion of a circumference of said engaging ring surface;

a generally curved inner surface groove segment extending from said main groove segment along a portion of said beveled ring surface;

an outer surface groove segment extending from said main groove segment along a portion of said outer ring surface; and a pair of pressure-applying elements provided on said mandrel on respective sides of said pair of backup rings, respectively.

9. The bridge plug or packer assembly of claim 8 wherein each of said pair of backup rings comprises an annular backup ring body and wherein said single spiral ring groove extends through said backup ring body.

10. The bridge plug or packer assembly of claim 9 wherein said backup ring body comprises an inner ring portion and an outer ring portion expandable with respect to said inner ring portion, and wherein said single spiral ring groove generally separates said outer ring portion from said inner ring portion.

11. The bridge plug or packer assembly of claim 10 further comprising at least one fluid emission channel extending into said engaging ring surface.

12. The bridge plug or packer assembly of claim 11 wherein said single spiral ring groove extends through said backup ring body and said outer ring surface and said beveled ring surface are each oriented at a taper angle with respect to a plane of said backup ring body.

13. A bridge plug or packer assembly, comprising:
a mandrel;
a first pressure-applying element provided on said mandrel;
a first backup ring provided on said mandrel and engaged by said first pressure-applying element;
a second backup ring provided on said mandrel in spaced-apart relationship with respect to said first backup ring;
at least one sealing element provided on said mandrel between said first backup ring and said second backup ring;
a second pressure-applying element provided on said mandrel and engaging said second backup ring; and
each of said first backup ring and said second backup ring having an engaging ring surface, a ring opening, a ring opening surface facing said ring opening, an outer ring surface and an inner beveled ring surface extending from said engaging ring surface to said ring opening surface and a single spiraled ring groove having a depth extending from said engaging ring surface to said beveled ring surface, said single spiraled ring groove including an elongated main groove segment extending along a portion of a circumference of said engaging ring surface; a generally curved inner surface groove segment extending from said main groove segment of said single spiraled ring groove along a portion of said beveled ring surface and an outer surface groove segment extending from said main groove segment of said single spiraled ring groove along a portion of said outer ring surface, said inner surface groove segment generally tangential with respect to said engaging ring surface and with respect to said ring opening surface.

14. The bridge plug or packer assembly of claim 13 wherein each of said pair of backup rings comprises an annular backup ring body and said single spiral ring groove extends through said backup ring body.

15. The bridge plug or packer assembly of claim 14 wherein said backup ring body comprises an inner ring portion and an outer ring portion expandable with respect to said inner ring portion, and wherein said single spiral ring groove generally separates said outer ring portion from said inner ring portion.

16. The bridge plug or packer assembly of claim 13 further comprising at least one channel extending into said engaging ring surface.

17. The bridge plug or packer assembly of claim 16 wherein each of said first backup ring and said second backup ring comprises an annular backup ring body and said single spiral ring groove extends through said backup ring body and said outer ring surface and said beveled ring surface are each oriented at a taper angle with respect to a plane of said backup ring body.

18. A bridge plug or packer assembly, comprising:
a mandrel;

a first pressure-applying element provided on said mandrel;

a first backup ring provided on said mandrel and engaged by said first pressure-applying element;

a second backup ring provided on said mandrel in spaced-apart relationship with respect to said first backup ring;

at least one sealing element provided on said mandrel between said first backup ring and said second backup ring; and a second pressure-applying element provided on said mandrel, each of said first backup ring and said second backup ring comprising:

an annular backup ring body having an engaging ring surface, a ring opening, a ring opening surface facing said ring opening, an outer ring surface, an inner beveled ring surface extending from said engaging ring surface to said ring opening surface, an inner ring portion and an outer ring portion expandable with respect to said inner ring portion;

a single spiraled ring groove generally separating said outer ring portion from said inner ring portion and having a depth extending from said engaging ring surface to said beveled ring surface, said single spiraled ring groove including an elongated main groove segment extending along a portion of a circumference of said engaging ring surface; a generally curved inner surface groove segment extending from said main groove segment of said single spiraled ring groove along a portion of said beveled ring surface and an outer surface groove segment extending from said main groove segment of said single spiraled ring groove along a portion of said outer ring surface, said inner surface groove segment generally tangential with respect to said engaging ring surface and with respect to said ring opening surface.

19. The bridge plug or packer assembly of claim 18 further comprising at least one fluid emission channel extending into said engaging ring surface.

20. The bridge plug or packer assembly of claim 19 wherein said outer ring surface and said beveled ring surface are each oriented at a taper angle with respect to a plane of said backup ring body.

\* \* \* \* \*